US007551181B2

(12) United States Patent
Criminisi et al.

(10) Patent No.: US 7,551,181 B2
(45) Date of Patent: *Jun. 23, 2009

(54) IMAGE REGION FILLING BY EXEMPLAR-BASED INPAINTING

(75) Inventors: Antonio Criminisi, Cambridge (GB);
Patrick Perez, Cambridge (GB);
Kentaro Toyama, Redmond, WA (US);
Michel Gangnet, Cambridge (GB);
Andrew Blake, Stapleford (GB)

(73) Assignee: Microsoft Corporation, Redmond, WA (US)

( * ) Notice: Subject to any disclaimer, the term of this patent is extended or adjusted under 35 U.S.C. 154(b) by 138 days.

This patent is subject to a terminal disclaimer.

(21) Appl. No.: 11/095,138

(22) Filed: Mar. 30, 2005

(65) Prior Publication Data

US 2005/0168482 A1 Aug. 4, 2005

Related U.S. Application Data

(63) Continuation of application No. 10/453,404, filed on Jun. 3, 2003, now Pat. No. 6,987,520, which is a continuation-in-part of application No. 10/373,635, filed on Feb. 24, 2003, now Pat. No. 7,088,870.

(51) Int. Cl.
*G09G 5/00* (2006.01)
(52) U.S. Cl. .................. 345/619; 345/641; 382/256
(58) Field of Classification Search .................. 345/619, 345/629–641, 582; 382/284, 256–259; 348/584–601
See application file for complete search history.

(56) References Cited

U.S. PATENT DOCUMENTS

| 5,420,966 | A | * | 5/1995 | Silverbrook | ................. 345/422 |
| 5,872,867 | A | | 2/1999 | Bergen | |
| 6,593,933 | B1 | | 7/2003 | Xu et al. | |
| 6,762,769 | B2 | | 7/2004 | Guo et al. | |
| 6,987,520 | B2 | * | 1/2006 | Criminisi et al. | ............ 345/629 |
| 2002/0136453 | A1 | * | 9/2002 | Aggarwal et al. | ........... 382/166 |

OTHER PUBLICATIONS

Patent Cooperation Treaty, "International Search Report", for International application No. PCT/US04/12850, Authorized officer Eric Woods, Dec. 13, 2005.
Zweck and Williams, "Euclidean Group Invariant Computation of Stochastic Completion Fields Using Shiftable-Twistable Functions", ECCV 2000, LNCS 1843, pp. 100-116, Berlin.

(Continued)

*Primary Examiner*—Richard Hjerpe
*Assistant Examiner*—Kimnhung Nguyen

(57) ABSTRACT

An example-based filling system identifies appropriate filling material to replace a destination region in an image and fills the destination region using this material, thereby alleviating or minimizing the amount of manual editing required to fill a destination region in image. Tiles of image data are borrowed from the proximity of the destination region or some other source to generate new image data to fill in the region. Destination regions may be designated by user input (e.g., selection of an image region by a user) or by other means (e.g., specification of a color or feature to be replaced). In addition, the order in which the destination region is filled by example tiles may be configured to emphasize the continuity of linear structures and composite textures using a type of isophote-driven image-sampling process.

19 Claims, 24 Drawing Sheets

OTHER PUBLICATIONS

Guy and Medioni, "Inferring Global Perceptual Contours from Local Features," Image Understanding Workshop, 1993, 29 pages.

Alexi A. Efros and Thomas K. Leung, "Texture Synthesis by Non-parametric Sampling", IEEE International Conference on Computer Vision, Corfu, Greece Sep. 1999.

M. Bertalmio, G. Sapiro, V. Caselles and C. Ballester, Image Inpainting, Computer Graphics, Proceedings of SIGGRAPH 2000, New Orleans, USA, Jul. 2000, pp. 417-424.

"International Search Report," International Application No. PCT/US04/00787, Dated Nov. 3, 2004, By Authorized Officer Ken Wielder.

* cited by examiner

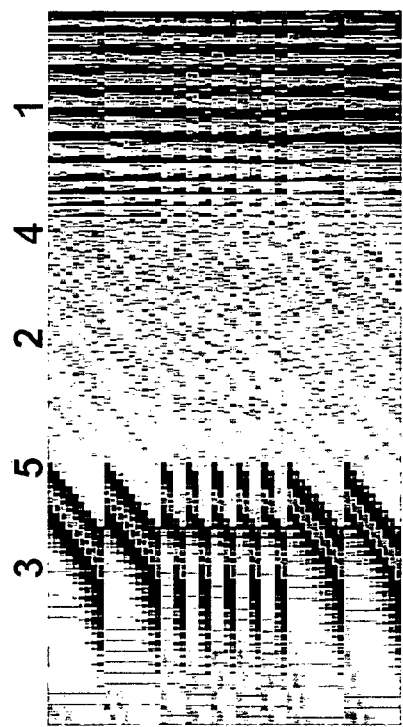
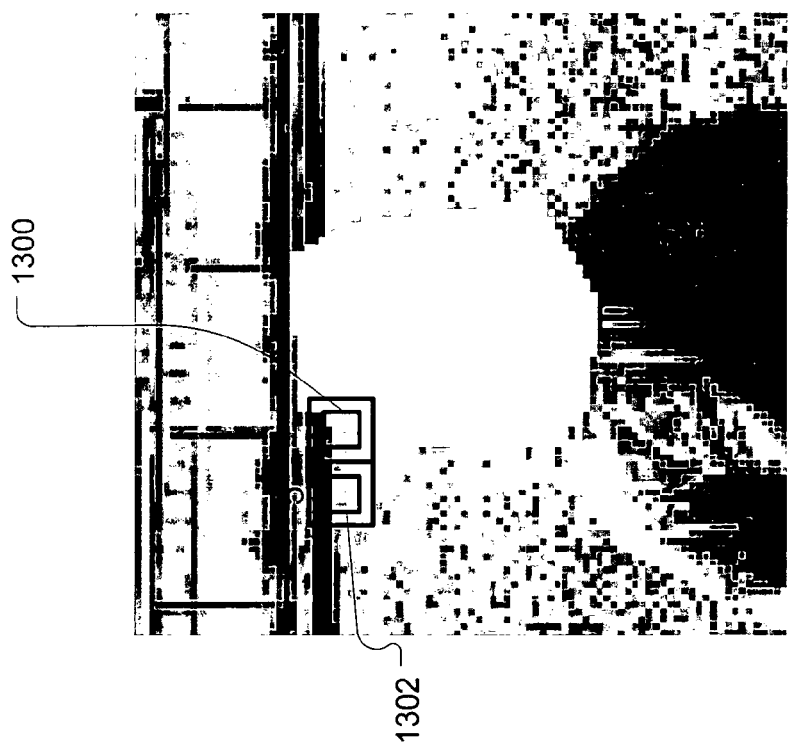
FIG. 13

IMAGE REGION FILLING BY EXEMPLAR-BASED INPAINTING

RELATED APPLICATIONS

This is a continuation of U.S. patent application Ser. No. 10/453,404, filed Jun. 03, 2003, and entitled "Image Region Filling by Exemplar-based Inpainting", which is a continuation-in-part of U.S. patent application Ser. No. 10/373,635, filed Feb. 24, 2003, and entitled "Image Region Filling by Example-Based Tiling", both of which are hereby incorporated herein by this reference.

TECHNICAL FIELD

The invention relates generally to image editing, and more particularly to filling regions in an image.

BACKGROUND

Editing digital images, particularly digital photographs, is a common activity in both domestic and professional contexts. Common tasks include repairing (e.g., hiding tears, scratches, stains, and other damage), correcting (e.g., removing red eyes and other undesirable features in the image), and modifying (e.g., removing features of the image to change its semantics) a digital image.

In many such activities, the task may be accomplished by "filling" a region in the image with other image data. For example, in FIG. 1, a digital image 100 depicts a house with a satellite dish 102 on its roof. If a user wishes to remove the satellite dish 102 from the roof of the house in the image 100, the user may employ an existing approach called "cloning". In cloning, the user manually copies one or more portions of backgrounds 104 and 106 and pastes them over the satellite dish 102 in appropriate locations and orientations, so as to hide the satellite dish 102. More sophisticated users may supplement this approach by manually introducing some local feathering at the borders of the pasted regions to conceal the seams.

However, the cloning approach is often time-consuming and tedious, if not impractical, and typically produces poor results at least in the following cases:
1. the region to fill (the "destination region") is large, at least in one dimension (e.g., a whole person, a long scratch);
2. the area available in the rest of the image for potential background sources is small;
3. the regions to fill in are small but numerous (e.g., superimposed text); and
4. the region to fill in is surrounded by more than one type of texture, thereby requiring re-creation of inter-region boundaries.

In addition, image regions often consist of both composite textures (i.e., multiple textures interacting spatially) and linear structures. Thus, image regions are typically complex products of mutual influences between different textures and structures, thereby limiting the effectiveness of cloning and pure texture synthesis.

Therefore, the existing approaches fail to satisfactorily fill destination regions in some images, are primarily manual, and are particularly ill-suited for many common scenarios.

SUMMARY

Embodiments of the present invention solve the discussed problems by borrowing example image data from the proximity of the destination region or some other source to generate new image data for filling in the region. The exemplar-based filling system identifies appropriate filling material to replace a destination region in an image and fills in the destination region using this material, thereby alleviating or minimizing the amount of manual editing required to fill a region in an image. Destination regions may be designated by user input (e.g., selection of an image region by a user) or by other means (e.g., specification of a color or feature to be replaced). In addition, the order in which the destination region is filled by example tiles may be configured to emphasize the continuity of linear structures and composite textures using a type of isophote-driven image-sampling process.

In implementations of the present invention, articles of manufacture are provided as computer program products. One implementation of a computer program product provides a computer program storage medium readable by a computer system and encoding a computer program that fills a destination tile in a destination region in an image with one or more example tiles.

The computer program product encodes a computer program for executing on a computer system a computer process for filling a destination tile in a destination region in an image with one or more example tiles. A fill priority is computed for each point on a fill front of the destination region in an image. The destination tile associated with a point on the fill front having the highest fill priority associated with the fill front is filled. A new fill front of the destination region is defined, excluding the filled destination file. A fill priority for each point on the new fill front is computed. The destination tile associated with a point on the new fill front having the highest fill priority associated with the new fill front is filled.

Another computer program product encodes a computer program for executing on a computer system a different computer process for filling a destination tile in a destination region in an image with one or more example tiles. A fill priority is computed for each point on a fill front of the destination region in an image, the fill priority being dependent upon a confidence factor and a strength factor. The destination tile associated with a point on the fill front having the highest fill priority associated with the fill front is filled, before filling any other point on the fill front.

In another implementation of the present invention, a method of filling a destination tile in a destination region in an image with one or more example tiles is provided. A fill priority is computed for each point on a fill front of the destination region in an image. The destination tile associated with a point on the fill front having the highest fill priority associated with the fill front is filled. A new fill front of the destination region is defined, excluding the filled destination file. A fill priority for each point on the new fill front is computed. The destination tile associated with a point on the new fill front having the highest fill priority associated with the new fill front is filled.

Another embodiment of the present invention provides a method of filling a destination tile in a destination region in an image with one or more example tiles. A fill priority is computed for each point on a fill front of the destination region in an image, the fill priority being dependent upon a confidence factor and a strength factor. The destination tile associated with a point on the fill front having the highest fill priority associated with the fill front is filled, before filling any other point on the fill front.

In yet another embodiment of the present invention, a system for filling a destination tile in a destination region in an image with one or more example tiles is provided. A priority module computes a fill priority for each point on a fill front of the destination region in an image. A filling module fills the destination tile associated with a point on the fill front having the highest fill priority associated with the fill front. A destination region processing module defines a new fill front of the destination region, excluding the filled destination file. The priority module further computes a fill priority for each point on the new fill front. The filling module further fills the destination tile associated with a point on the new fill front having the highest fill priority associated with the new fill front.

In yet another embodiment of the present invention, a system for filling a destination tile in a destination region in an image with one or more example tiles is provided. A priority module computes a fill priority for each point on a fill front of the destination region in an image, the fill priority being dependent upon a confidence factor and a strength factor. A filling module fills the destination tile associated with a point on the fill front having the highest fill priority associated with the fill front, before filling any other point on the fill front.

These and various other features as well as other advantages, which characterize the present invention, will be apparent from a reading of the following detailed description and a review of the associated drawings.

BRIEF DESCRIPTION OF THE DRAWINGS

FIG. 13 depicts a matching dictionary tile and an associated neighborhood in an implementation of the described system.

DETAILED DESCRIPTION

The exemplar-based filling described herein provides a powerful alternative to existing cloning-type techniques. The exemplar-based filling system can identify appropriate filling material to replace a destination region in an image and fill the destination region using this material. This approach alleviates or minimizes the amount of manual editing previously required to fill a destination region in an image. Tiles of image data are borrowed from the proximity of the destination region or some other source to generate new image data to fill in the region. Destination regions may be designated by user input (e.g., selection of an image region by a user) or through other means (e.g., specification of a color or feature to be replaced). In addition, the order in which the destination region is filled by example tiles may be configured to emphasize the continuity of linear structures and composite textures using a type of isophote-driven image-sampling process.

Figure 1:
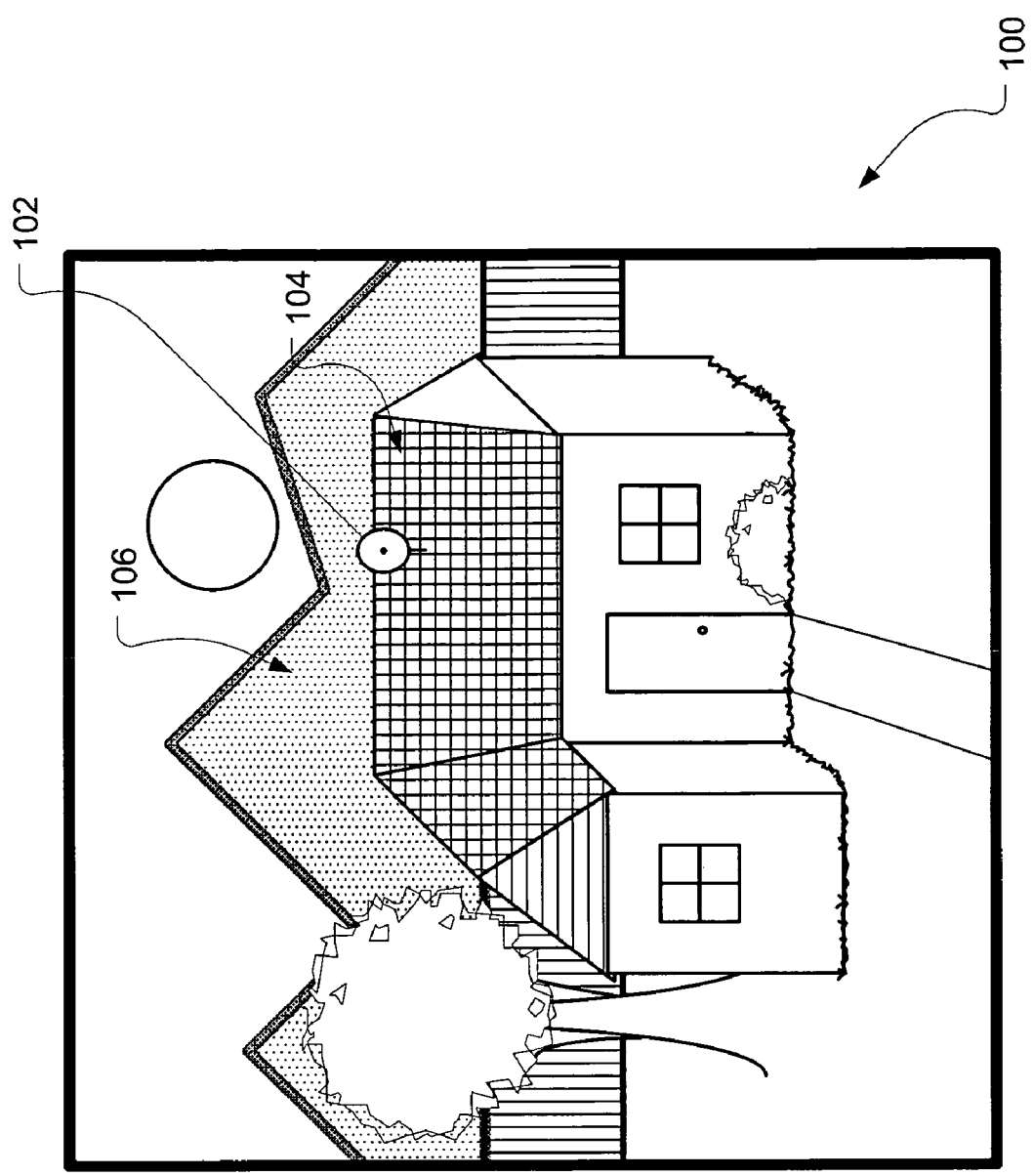
FIG. 1 illustrates an unedited image displayed in an implementation of the described system.

FIG. 1 illustrates an unedited image displayed in an embodiment of the present invention. The digital image 100 depicts the house with the satellite dish 102 on its roof. For the purpose of this description, a user wishes to delete the satellite dish from the image 100.

Generally, digital images are composed of pixels (short for "picture elements"). A pixel is the smallest logical unit of visual information that can be used to build a digital image. Pixels are the little light elements that can be seen when a graphics image is enlarged. The more pixels in an image, the better its resolution. Digital images are typically represented by intensity values for individual pixels in an array. For color images, for example, a color intensity value for each channel is associated with a given pixel.

Figure 2:
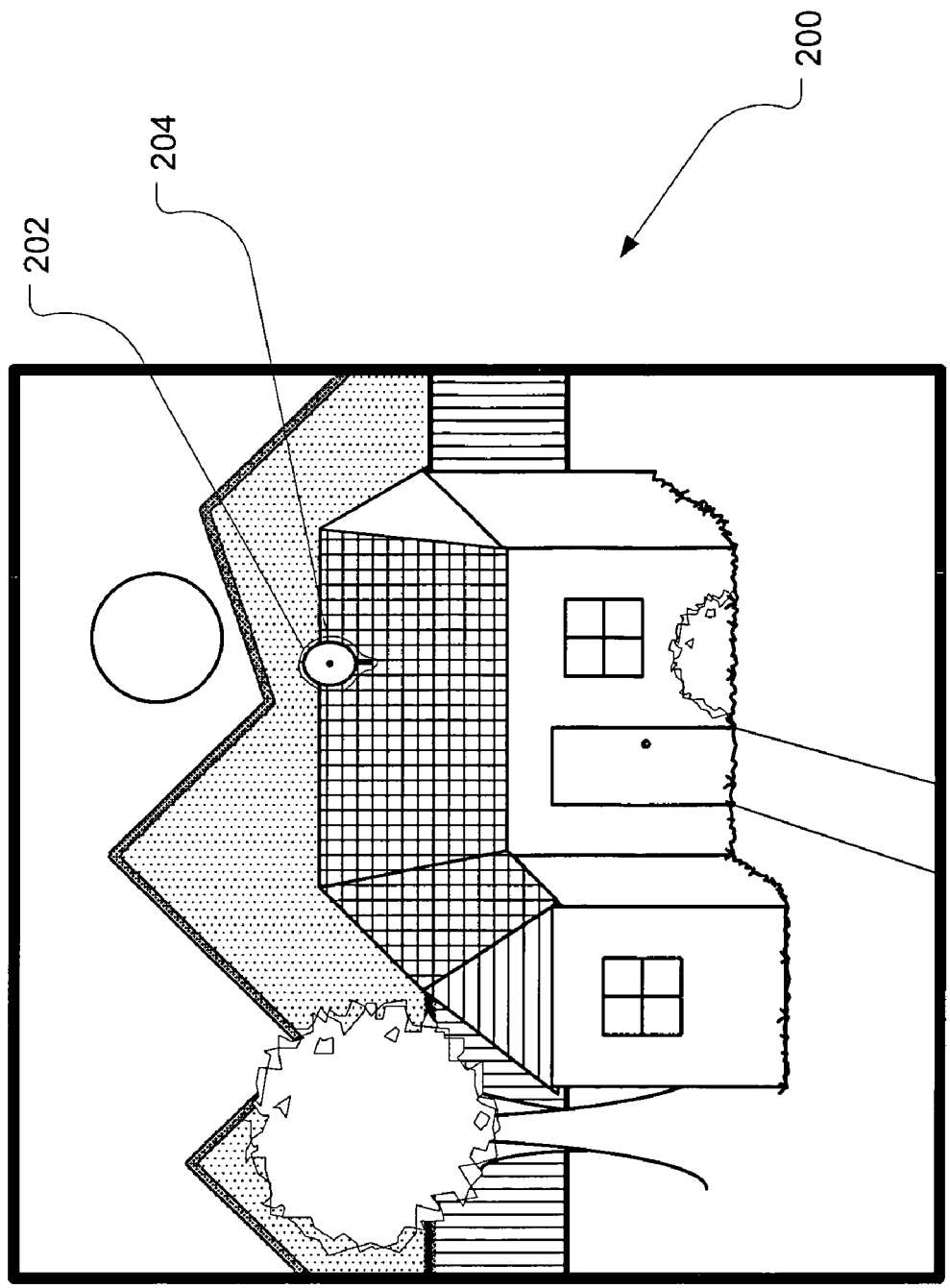
FIG. 2 illustrates a selected region in an image displayed in an implementation of the described system.

FIG. 2 illustrates a selected destination region in an image displayed in an embodiment of the present invention. The digital image 200 depicts the house with the satellite dish 202 on its roof. In an embodiment of the present invention, if the user wishes to remove the satellite dish 202 from the roof of the house, the user may select the region around the satellite dish 202, as shown by shaded region 204. A "delete-and-fill" command is executed to remove the satellite dish 202 from the image and to fill in the destination region designated by the shaded region 204.

Figure 3:
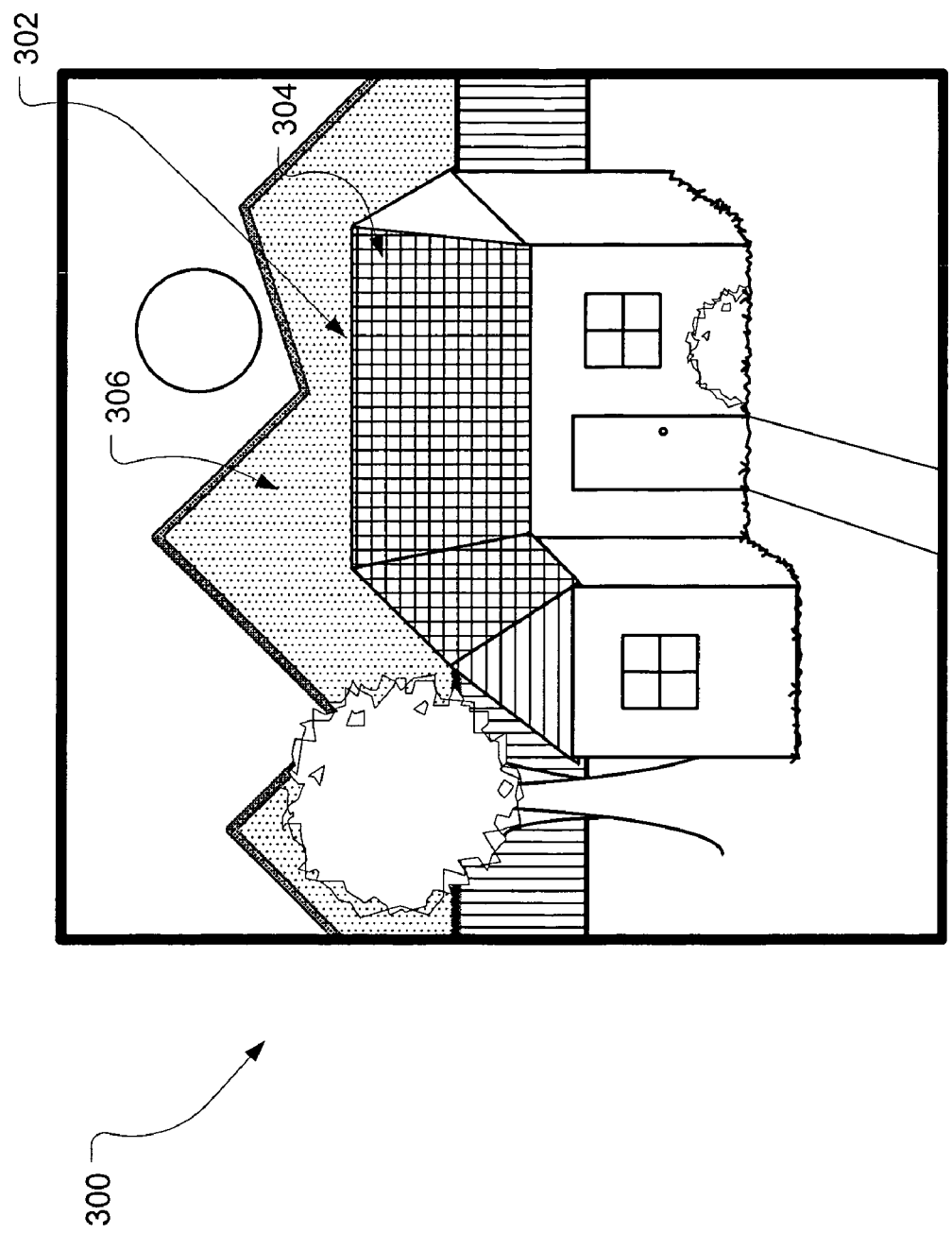
FIG. 3 illustrates an image having a filled destination region in implementation of the described system.

FIG. 3 illustrates an image having a filled destination region in an embodiment of the present invention. The digital image 300 depicts the house without the satellite dish on its roof. In an embodiment of the present invention, to remove the satellite dish from the image, the "delete-and-fill" command deletes the selected region and fills the deleted area with example tiles taken from the proximity of the deleted area, so that example tiles containing image data of the backgrounds 304 and 306 re-create portions of the top of the roof and of the background mountain scenery behind the satellite dish.

Figure 4:
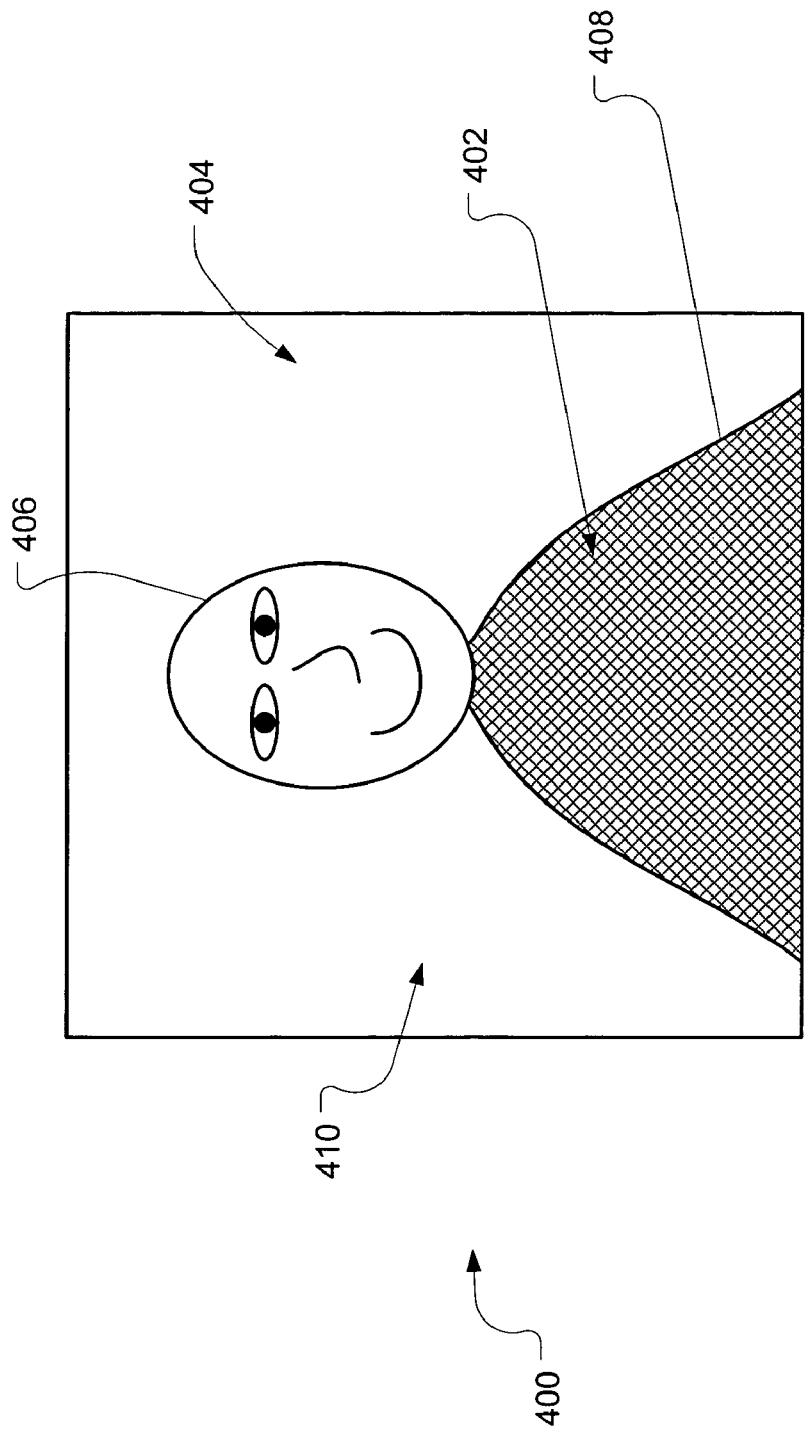
FIG. 4 illustrates another unedited image displayed in an implementation of the described system.

FIG. 4 illustrates another unedited image displayed in an embodiment of the present invention. A portrait image 400 shows a happy bald man 410 in a barber's smock 408. However, the user wishes to remove the head 406 of the man 410 in the image 400. To accomplish this, example tiles containing image data of the smock 402 and the background 404 are used to replace image data in the destination region surrounding the head 406.

Figure 5:
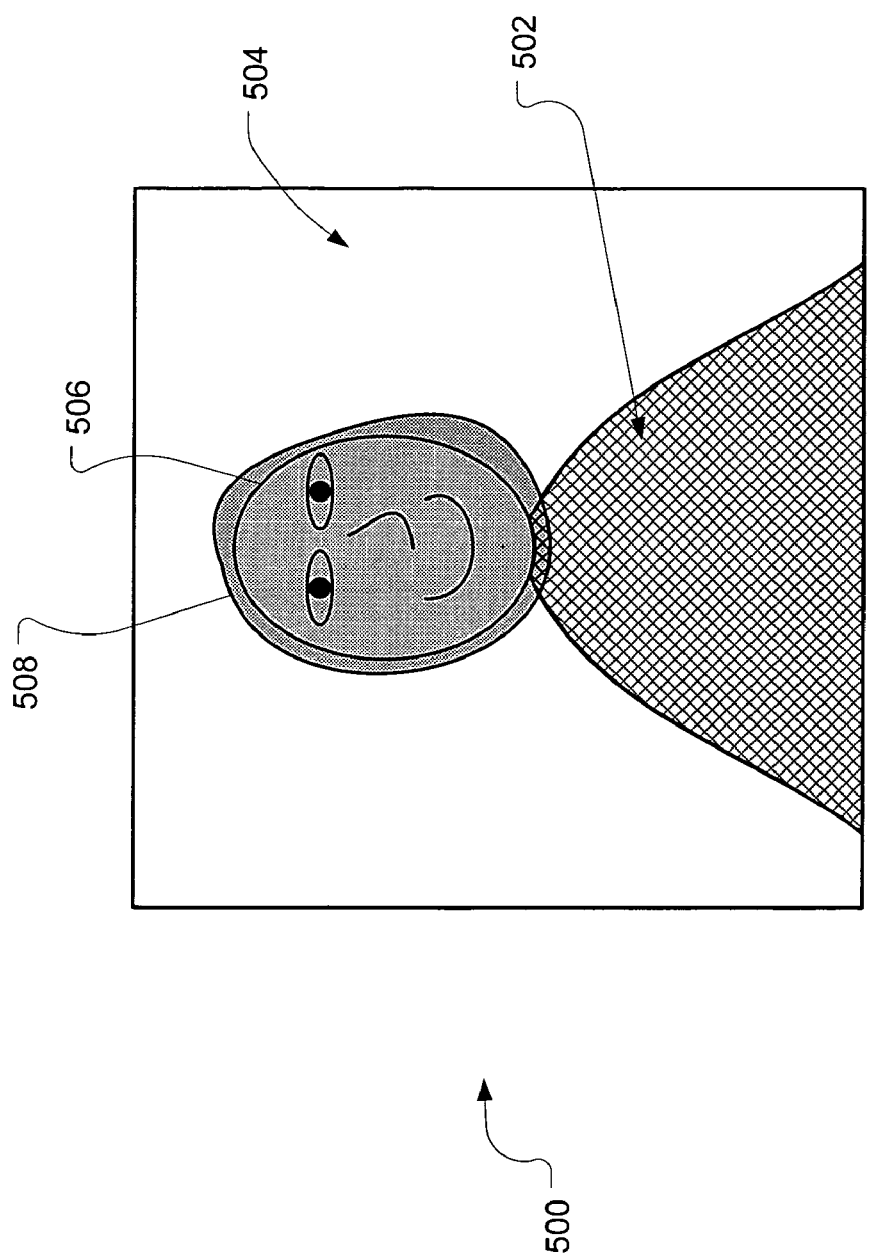
FIG. 5 illustrates a selected destination region in an image displayed in an implementation of the described system.

FIG. 5 illustrates a selected destination region in an image displayed in an embodiment of the invention. A portrait image 500 shows the happy bald man with a destination region 508 selected around his head 506. The selected region 508 includes image data of both the smock 502 and the background region 504.

Figure 6:
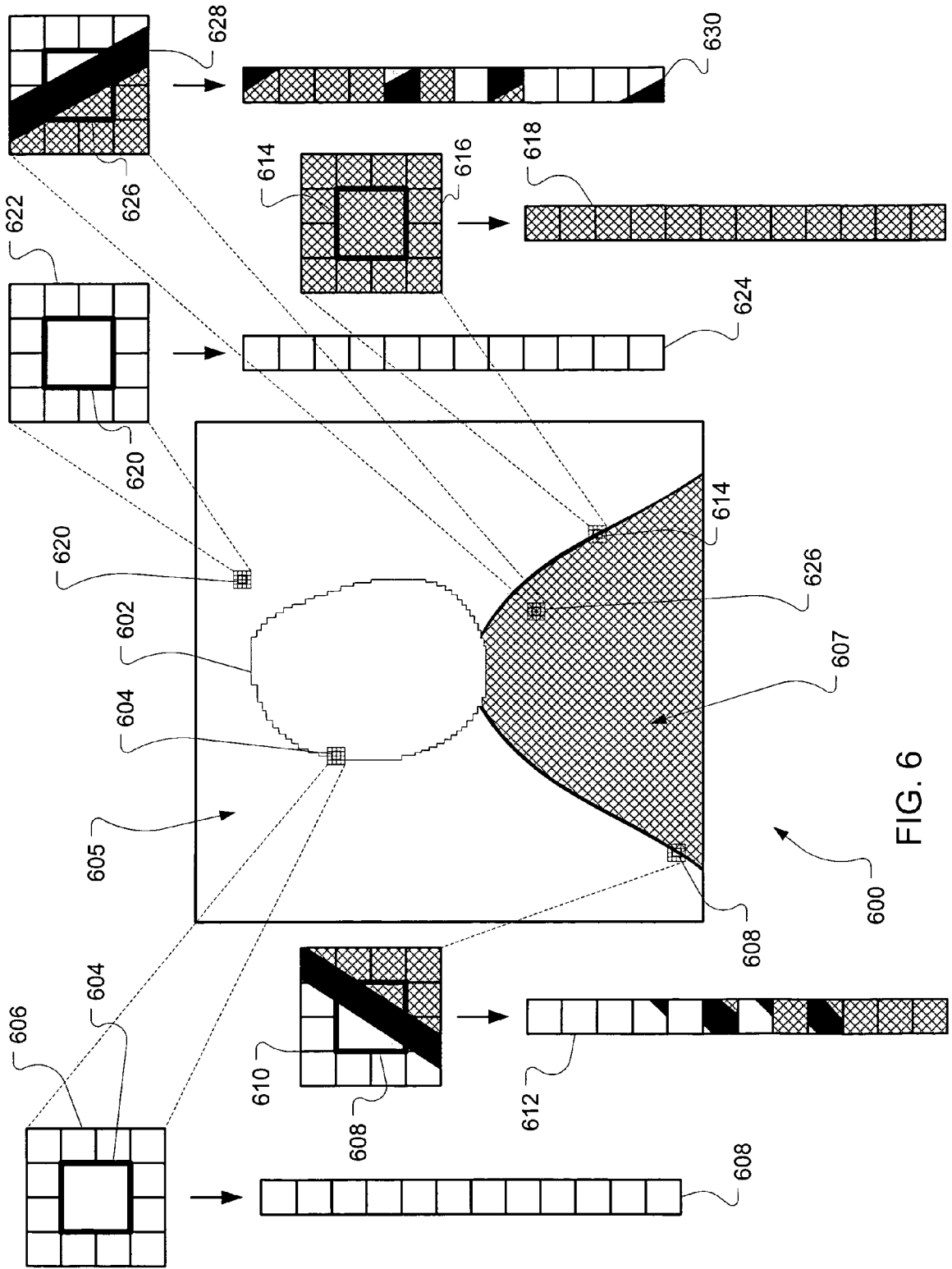
FIG. 6 illustrates a destination tile, multiple example tiles, and neighborhood tiles of each in an implementation of the described system.

FIG. 6 illustrates a destination tile, multiple example tiles, and neighborhood tiles of each in an embodiment of the present invention. Generally, tiles are groups of pixels laid out in a grid within the destination region (i.e., such that some portion of each tile is within the destination region). In one embodiment, responsive to execution of the "delete-and-fill" command, the image data corresponding to the destination region 602 is deleted from the image 600. A destination tile 604 is selected with an associated destination neighborhood 606 from the image 600. Each selection of a destination tile selects a tile that has some original material (i.e., original image data) or filled-in material (i.e., replacement image data) in its neighborhood (collectively, "filled image data"). Alternatively, the tiles in the destination region are not actually deleted, but are replaced by new image data from a dictionary or other source of exemplar image data (such as a dynamic dictionary of image data). Both the delete-and-insert operation and the replace operation are considered replacing operations in that the original destination region image data is replaced with new image data.

The destination neighborhood 606 includes five neighborhood elements incorporating image data from the background 605 and seven neighborhood elements corresponding to the destination region 602. It should be understood that the concept of neighborhood elements are discussed merely to assist in describing the Figure and that destination neighborhood elements may include both portions incorporating image data from outside the destination region and portions corresponding to the destination region 602.

In one embodiment, an objective of the "delete-and-fill" command is to identify an example tile (from a source) that provides a close match of the five neighborhood elements incorporating the background 605. The destination neighborhood elements 606 are illustrated in an array 608 to simplify the description of a matching operation below.

Example tiles are taken from a source, which may include without limitation regions of the image in proximity to the destination region 602, other specified regions of the image 600, imported image data, algorithmically-defined image data, etc. In the embodiment illustrated in FIG. 6, the source is defined to include any image data within the image 600 (except the deleted destination region 602).

In one implementation, a dictionary of example tiles is created from the source region of the image 600. Exemplary selections of example tiles 608, 614, 620, and 626 are shown in FIG. 6 in combination with exploded views of each example tile and its neighborhood (608 and 610, 614 and 616, 620 and 622, and 626 and 628) well as an array view of each neighborhood (612, 618, 624, and 630). In an embodiment of the present invention, image data for each example tile is stored in association with an array of image data for its neighborhood. In this manner, an appropriate example tile for filling can be identified by a match between its associated neighborhood and the neighborhood of the destination tile. In an alternative embodiment, example data may be dynamically determined as each destination tile is determined (e.g., based on the color or structure content of the destination tile, based on the location of the destination tile, etc.).

To determine which example tile will replace the destination tile 604 in the image 600, the populated neighborhood elements associated with the destination tile 604 (i.e., the first five elements of array 608) are compared with the relevant neighborhood elements of each example tile (i.e., the first of 5 elements of the array). In an embodiment of the present invention, the example tile having relevant neighborhood elements best matching the existing neighborhood elements of the destination tile 604 is selected to replace the destination tile 604 in the image 600. For color images, the pixel values of multiple color channels (e.g., red, green, blue or RGB) are considered in the best match comparison.

A "best match" may be defined in various ways within the scope of the present invention. In one embodiment, a least squared error determination is made between the relevant neighborhood elements of an example tile and the existing neighborhood elements of the destination tile 604.

In one embodiment, a cost function is computed to determine the best matching example tile from the dictionary. The lowest cost example tile is designated as the "best match". An exemplary cost function $£_k(x)$ is given by:

$$£_k(x) = \|x - x_k\|^2,$$

where x represents the image data vector for an existing neighborhood of the destination tile and $x_k$ represents the image data vector for a relevant neighborhood of a candidate example tile k.

In an alternative embodiment, matching rules may be defined to identify a customized "best match". In addition, alternative algorithms are contemplated for defining a "best match" within the scope of the present invention, including without limitation a best match operation involves minimizing or otherwise optimizing any dissimilarity measure, including so called L1 and Lsup distances.

In the illustrated embodiment, the relevant neighborhood elements of example tile 620 provide the best match with the existing neighborhood elements in the destination tile 604. Therefore, the example tile 620 is selected to replace the destination tile 604 in the image 600. The visual effect of this replacement is that the portion of the destination region 602 formerly occupied by destination tile 604 is replaced by example tile 620, which shows the background 605. It should also be understood, that other destination tiles, such as those in the proximity of the man's neck and shoulders, will be replaced by example tiles showing an interface between the background 605 and the smock 607.

The description of FIG. 6 addresses an exemplary embodiment of the present invention. It should be understood, however, that the specific dimensions and shapes of the destination tiles, example tiles, and their respective neighborhoods are not limited to those described with respect to FIG. 6. Moreover, the ordering of the neighborhood elements stored in each array is arbitrary, so long as the ordering is consistent between the destination tile array and the example tile arrays.

Figure 7:
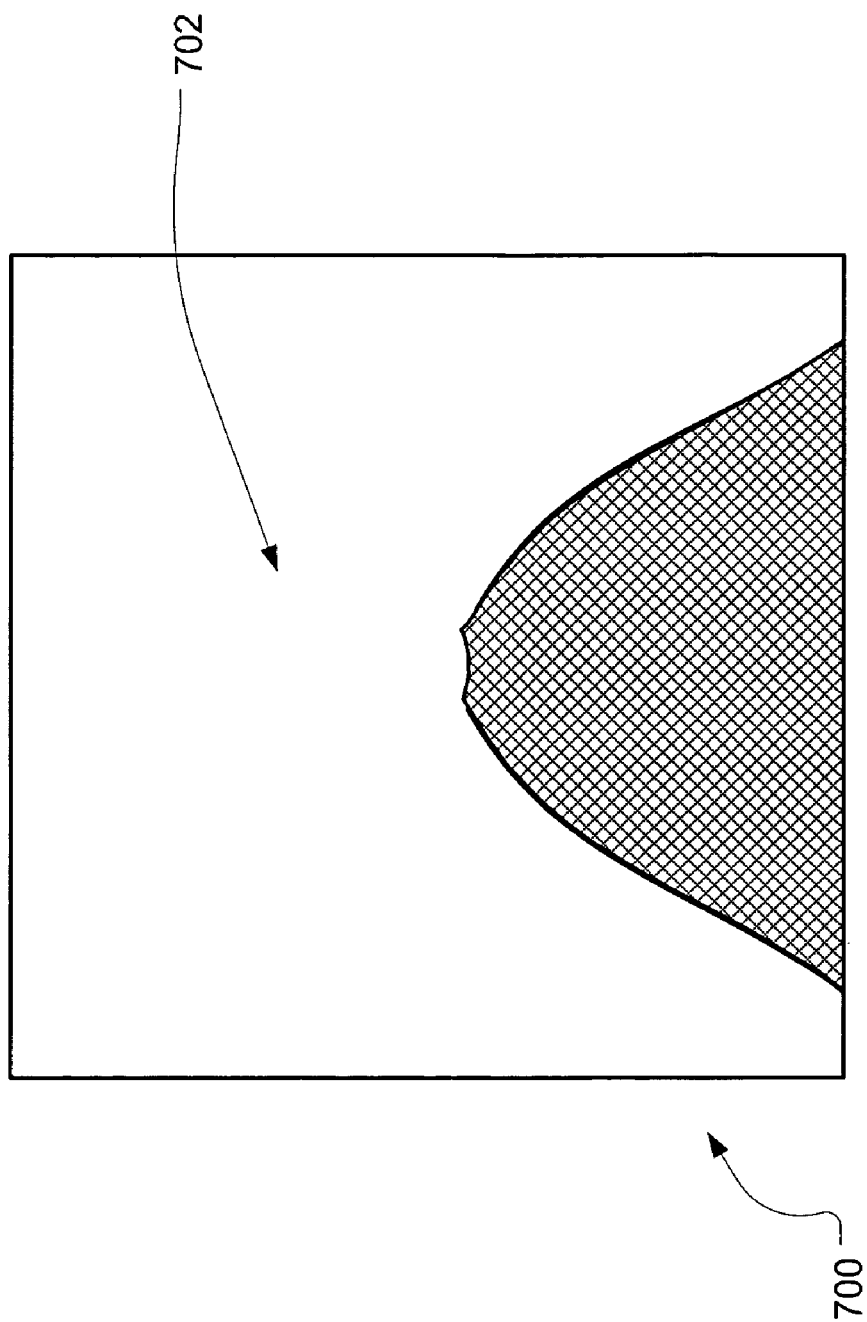
FIG. 7 illustrates an image having a filled destination region in an implementation of the described system.

After replacement of a destination tile by an example tile, a new destination tile is selected within the destination region 602 of image 600. Each selection of a destination tile selects a tile that has some original material (i.e., original image data) or filled-in material (i.e., replacement image data) in its neighborhood. In this manner, destination tiles are progressively replaced with matching example tiles until the destination region 602 is filled in. That is, as the destination tiles are replaced (or filled-in), the filled-in image data within the original boundary of the destination region 602 decreases the size of the non-filled-in destination region. FIG. 7 illustrates a filled destination region 702 in the image 700 displayed in an embodiment of the present invention.

Figure 8:
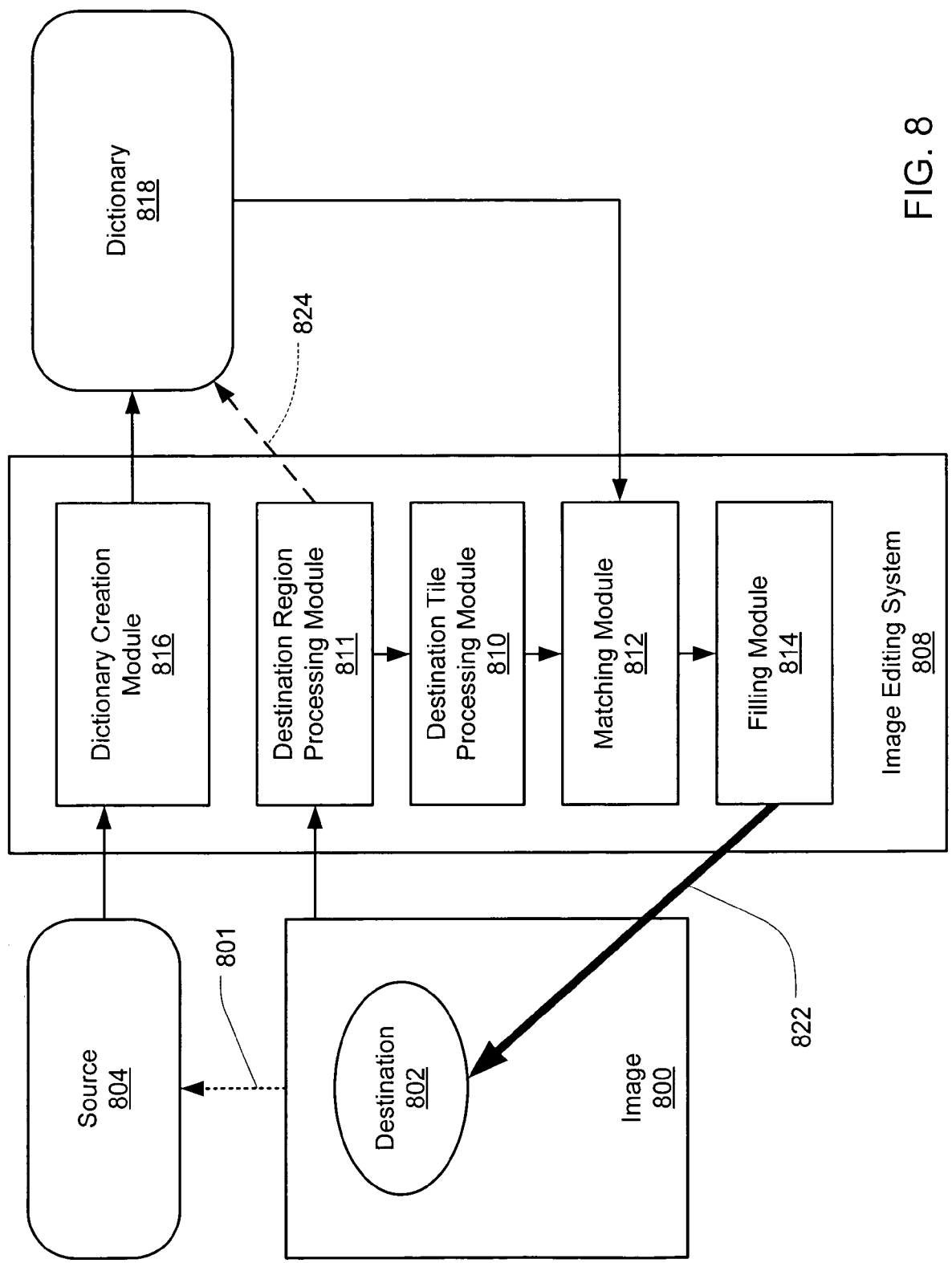
FIG. 8 depicts an image editing system in an implementation of the described system.

FIG. 8 depicts an image editing system in an embodiment of the present invention. In one embodiment, the image editing system includes a computer executing image editing software implementing the region filling operations described herein. However, alternative embodiments may include without limitation specialized image editing systems, video editing systems, and print shop editing systems. In addition, the image editing system may include other modules of known image editing programs.

A destination region 802 has been defined in an image 800. It should be understood that images, destination regions, and tiles may be defined in shapes and sizes other than the squares shown in the illustrations, including circles, triangles, and individual pixels. A source 804 may also be defined from within the image 800 (as shown by dotted arrow 801), although source image data may be received from a source outside the image (e.g., imported from other images, defined by a set of rules, etc.).

In the illustrated embodiment, the image data of the destination region is not deleted, but merely replaced with example tiles during a replacement operation. In alternative embodiments, a destination region processing module 811 receives the definition of the destination region, deletes the image data therein, and then inserts new image data into the destination region. At least these two approaches represent examples of a filling operation, although other approaches are also contemplated.

A dictionary creation module 816 generates a dictionary 818 of image data from the source 804. The dictionary includes examples tiles, which are used to replace destination tiles in the destination region 802. If the dictionary 818 is a dynamic dictionary, a new dictionary 818 may be generated by the dictionary creation module 816 as each destination tile is selected and processed (as specifically illustrate by dashed line 824).

A destination tile processing module 810 receives a definition of the destination region 802 and chooses the destination tiles there from. In one embodiment, the destination tile processing module 810 defines a grid over the destination region 802 and progressively selects individual destination tiles for replacement. (It should be understood, however, that a defined grid is not required in all implementations. For example, the implementation described with regard to FIGS. 18-22 is based on tiles defined about an individual point or pixel, rather than tiles laid out on a grid.) Each destination tile selected is associated with a destination neighborhood containing image data from outside the destination tile. Furthermore, in at least one embodiment, each destination tile includes at least a portion of the original image data or the filled-in image data in its neighborhood.

A matching module 812 determines which candidate example tile defined in the dictionary 818 provides the best match with the selected destination tile. A filling module 814 copies the image data of the "best match" example tile to replace the destination tile.

It should be understood that some amount of additional processing may also be performed on the copied image data. For example, for boundary destination tiles, only a portion of the image data from the "best match" example tile may be replaced into the destination tile, thereby maintaining any original image data that had existed in the destination tile outside of the defined destination region (e.g., if the destination tile overlaps the boundary of the selected destination region). In an alternative embodiment, however, all of the image data of the example tile replaces the entire destination tile. The filling operation 814 operates on the destination region 802, as shown by bold arrow 822.

Figure 9:
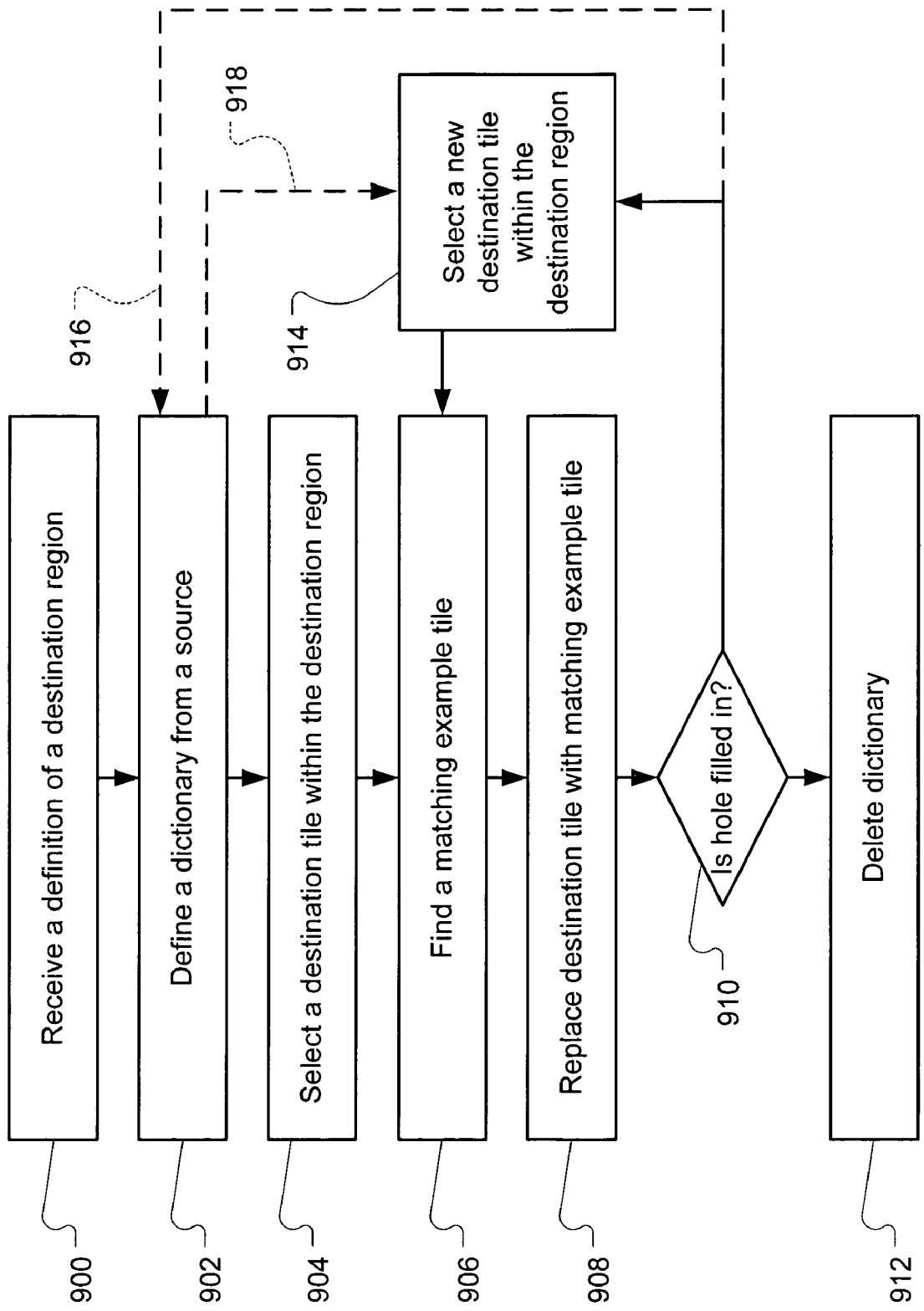
FIG. 9 illustrates operations for filling a destination region in an implementation of the described system.

FIG. 9 illustrates operations for filling a destination region in an embodiment of the present invention. A definition of a destination region is received in a receiving operation 900. In one embodiment, a destination region definition may be received by a user selection of an area in the image. The region may be defined as a single graphically selected area (e.g., selected by dragging the mouse cursor along the boundary of the desired destination region), definitions of multiple areas in the image, one or more sets of coordinates, or other location oriented methods. Alternatively, other methods of defining the destination region may include specifying a color to be replaced (e.g., to remove red text that overlays a photograph), specifying a graphics layer in a digital image, using pattern recognition techniques, or using a combination of any of these methods (e.g., specifying a color to be replaced in one or more specified areas of an image).

A defining operation 902 defines a dictionary of image data from a source. A source may be defined in various ways, including without limitation a location oriented method within the image, specification of example tiles from another image, importation of a dictionary from other files, color based methods, layer based methods, or combinations of these or other methods. In one exemplary embodiment, examples tiles are taken from the proximity of the destination region in the image. In another exemplary embodiment, example tiles are taken from a source region within the image, which has been specified by the user. As shown by dashed arrows 916 and 918, the defining operation 902 may also be included in the loop for selecting and processing individual destination tiles.

A selection operation 904 selects a first destination tile from within (or overlapping the boundary of) the destination region. In one embodiment, a grid of uniformly sized tiles is defined over the destination region to identify the set of destination tiles. The first destination tile is selected from this grid, such that the destination tile includes some pixels from the destination region and includes image data from outside the destination region.

A matching operation 906 identifies the example tile from the dictionary that has a neighborhood that best matches the neighborhood of the destination tile. Responsive to the matching operation 906, a replacing operation 908 replaces the destination tile in the destination region with the matching example tile from the dictionary. In one embodiment, the image data of the example tile is copied into the location defined by the destination tile. For some destination tiles, particularly those on the boundary of the original destination region, some original material that is strictly outside the originally defined destination region may be replaced in this operation. Alternatively, additional processing of the example tile prior to replacement may prevent the overwriting of such original material. Optimization of the size and positioning of the destination tiles within the destination region can influence the amount of original material replaced in the replacing operation 908.

A decision operation 910 determines if any additional destination tiles exist in the destination region that require filling. If so, a selection operation 914 selects a new destination tile from within the destination region. In one embodiment, the progressive selection of new destination tiles proceeds along the boundary of the destination region. As each destination tile is replaced, the destination region gets smaller. Each selection of a destination tile selects a tile that has some original material (i.e., original image data) or filled-in material (i.e., replacement image data) in its neighborhood. This progressive selection and filling of new destination tiles continues until the destination region is filled. If the decision operation 910 determines that the entire destination region has been filled, a deleting operation 912 deletes the dictionary.

It should be understood that, while the dictionary is employed as a convenient persistent data structure in an exemplary implementation, alternative implementations are contemplated. For example, in one implementation, the source region is completely or partially searched for each destination tile.

Figure 10:
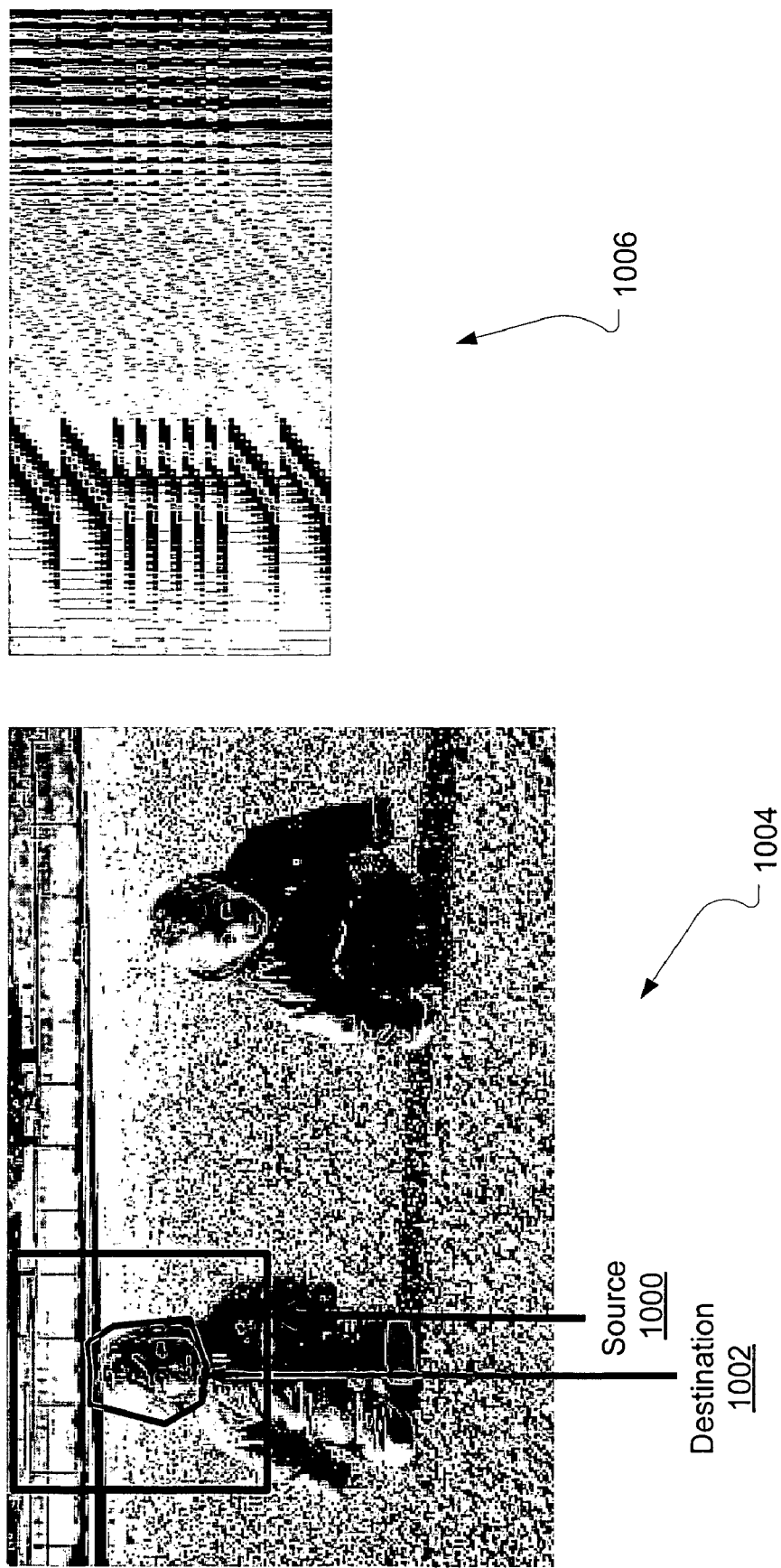
FIG. 10 depicts a digital image and an associated dictionary in an implementation of the described system.

FIG. 10 depicts a digital image 1004 and an associated dictionary 1006 of image data in an embodiment of the present invention. A destination region 1002 is defined in the image 1004. The associated dictionary 1006 includes image data from example tiles and associated example neighborhoods within the designated source 1000. The source 1000 may be defined by user selection, by a predefined rule (e.g., as a rectangular region surrounding the destination region 1002 by at least X pixels), or by other means. In the illustrated embodiment, the source 1000 is defined by a user selection or by a region in proximity around the destination region 1002. For the purpose of this description, the image data in the dictionary 1006 is illustrated in vertical arrays across the width of the dictionary 1006.

Figure 11:
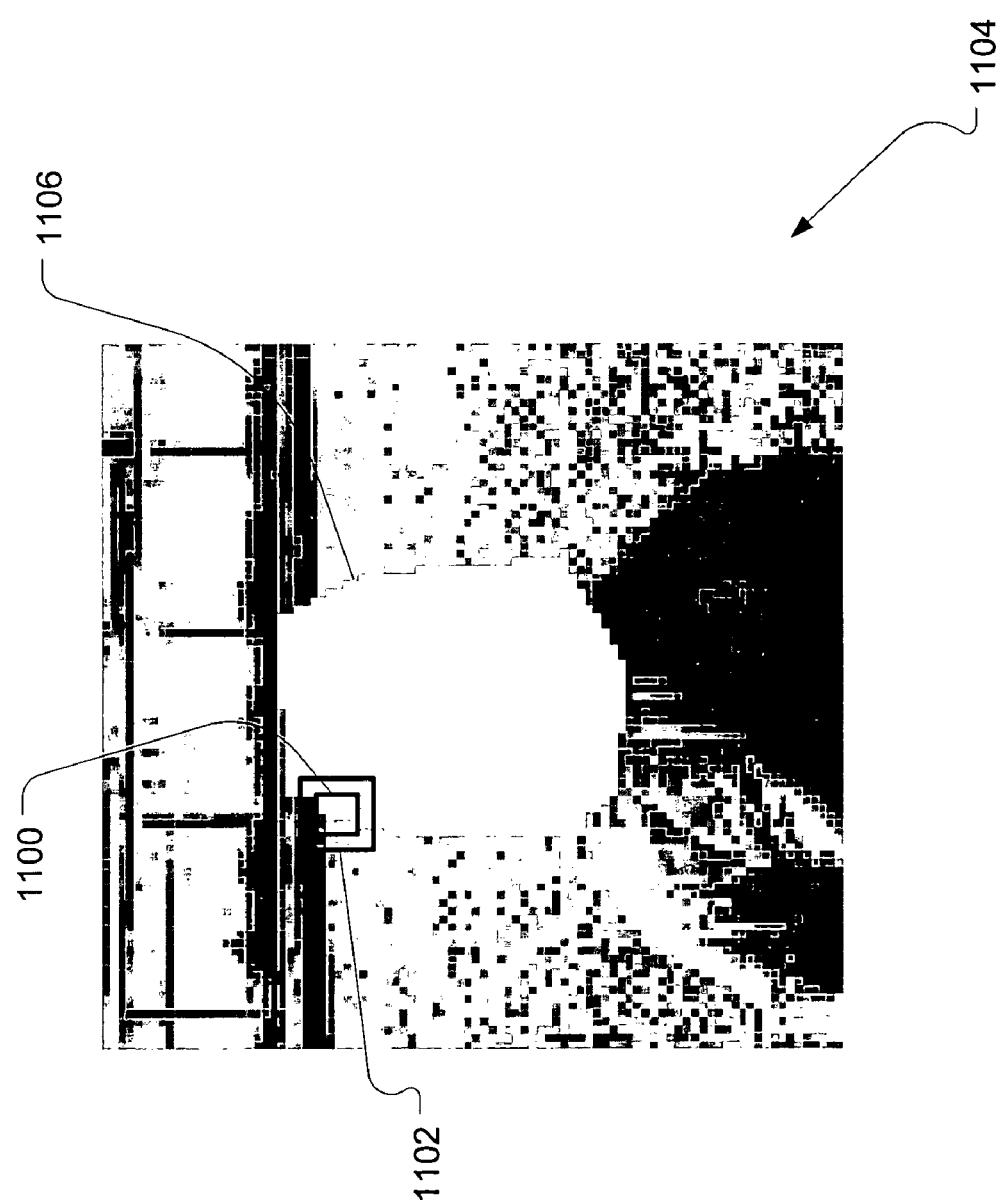
FIG. 11 depicts a destination tile and an associated neighborhood in an implementation of the described system.

FIG. 11 depicts a destination tile 1100 and an associated destination neighborhood 1102 in an embodiment of the present invention. The initial choice of the destination tile 1100 includes at least a portion of the destination region 1106 (e.g., the deleted destination region) in the destination tile 1100 and at least a portion of the original image data of the image 1104 in the neighborhood 1102 of the destination tile 1100. In this manner, the selected example tiles used to replace the destination tiles provide a blended, realistic solution across the destination region.

In an embodiment, the destination tile 1100 is chosen by defining a grid over the destination region 1106. The grid elements are defined to be the size of the destination tile. It should be understood that the size and shape of the grid elements and the destination tiles, as well as the relative position of the grid to the destination region 1106, may be varied to optimize the desired granularity of the filling operation, the smoothness of seams, the speed of computation, and the amount of original material that is replaced by the example tiles. However, in most cases, acceptable results can be achieved without any specific tuning of these parameters.

In another embodiment, individual destination tiles and the candidate example tiles can be jointly varied in size to optimize results. For example, destination tiles around the boundary of the original destination region and the associated dictionary tiles may be smaller to maintain the most original material from the original image around the boundary. Thereafter, farther way from the boundary, larger destination tiles, and therefore larger associated dictionary tiles may be used to minimize computational needs.

Figure 12:
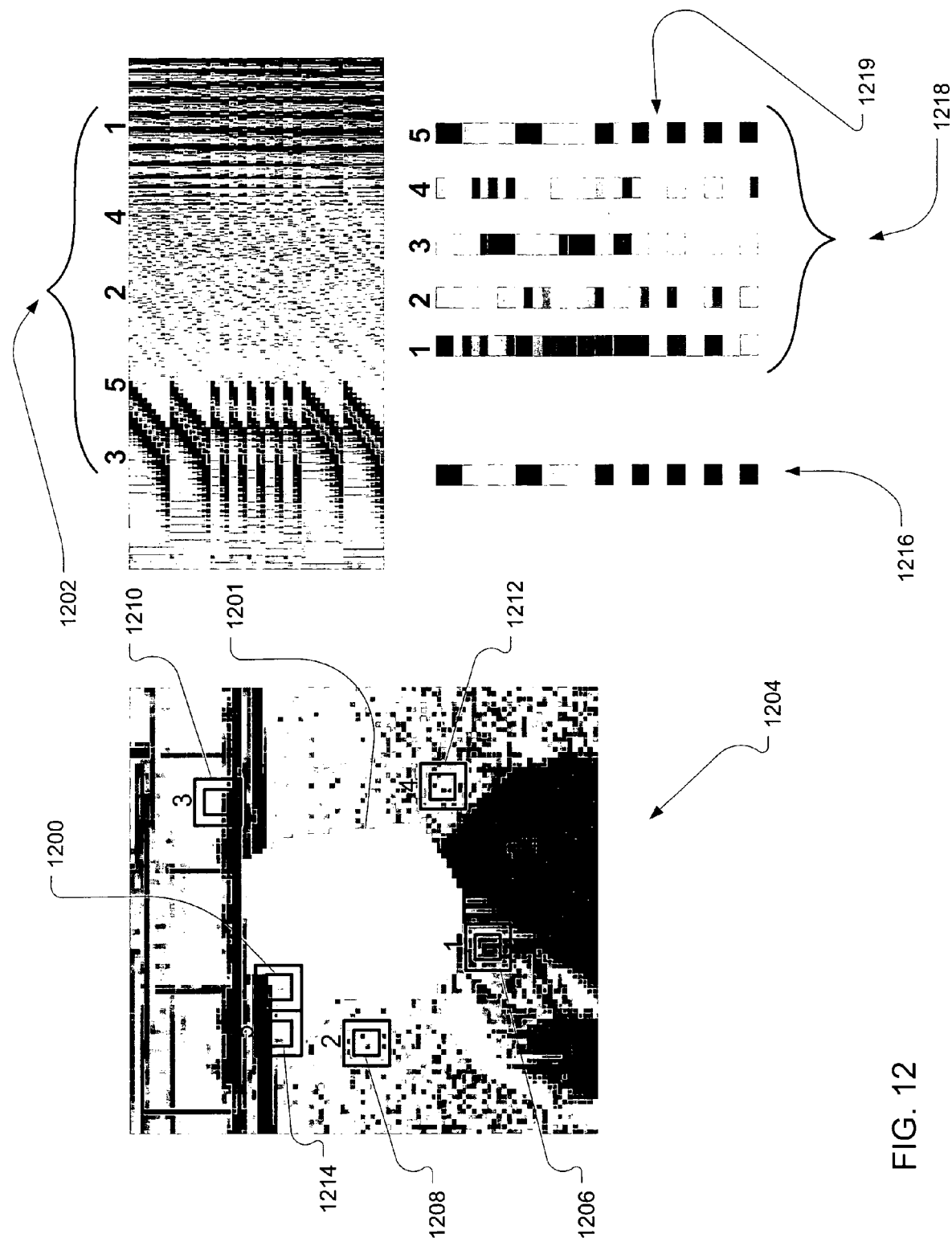
FIG. 12 depicts candidate dictionary tiles and associated neighborhoods in an implementation of the described system.

FIG. 12 depicts various candidate example tiles 1206, 1208, 1210, 1212, and 1214, and associated neighborhoods in an embodiment of the present invention. The image data in the neighborhood of the destination tile 1200 is shown at 1216. The image data in the neighborhood of the candidate example tiles are shown in 1218: Numbered column "1" corresponds to candidate example tile 1206, column "2" to tile 1208, column "3" to tile 1210, column "4" to tile 1212, and column "5" to tile 1214. Likewise, the numbered columns 1202 in the dictionary 1203 correspond to the image data of neighborhoods of all candidate tiles in the source.

Alternative sources of candidate tiles are also contemplated, including less persistent dictionaries dynamically and destroyed for each tile or individual sets of tiles, and dictionaries includes additional information to augment the neighborhood image data (e.g., including the image data of the candidate tile or other annotations data).

In the illustrated embodiment, the columns 1218 show portion of the neighborhood image data is omitted (see, for example, the gap 1219 in the image data for column "5"). These omissions in the candidate example tile arrays correspond to image data in the neighborhood of the destination tile 1200 that are located within the destination region 1201 or have not yet been filled in. The image data of these omitted portions is not considered in the matching operation used to determine the best match example tile.

FIG. 13 depicts a matching dictionary tiles and an associated neighborhood in an embodiment of the present invention. The matching operation has determined that the relevant neighborhood data of the candidate example tile 1302 provides the best match to the existing neighborhood data of the destination tile 1300. The similarities between the neighborhoods can be seen by a comparison between the arrays 1306 and 1308.

Figure 14:
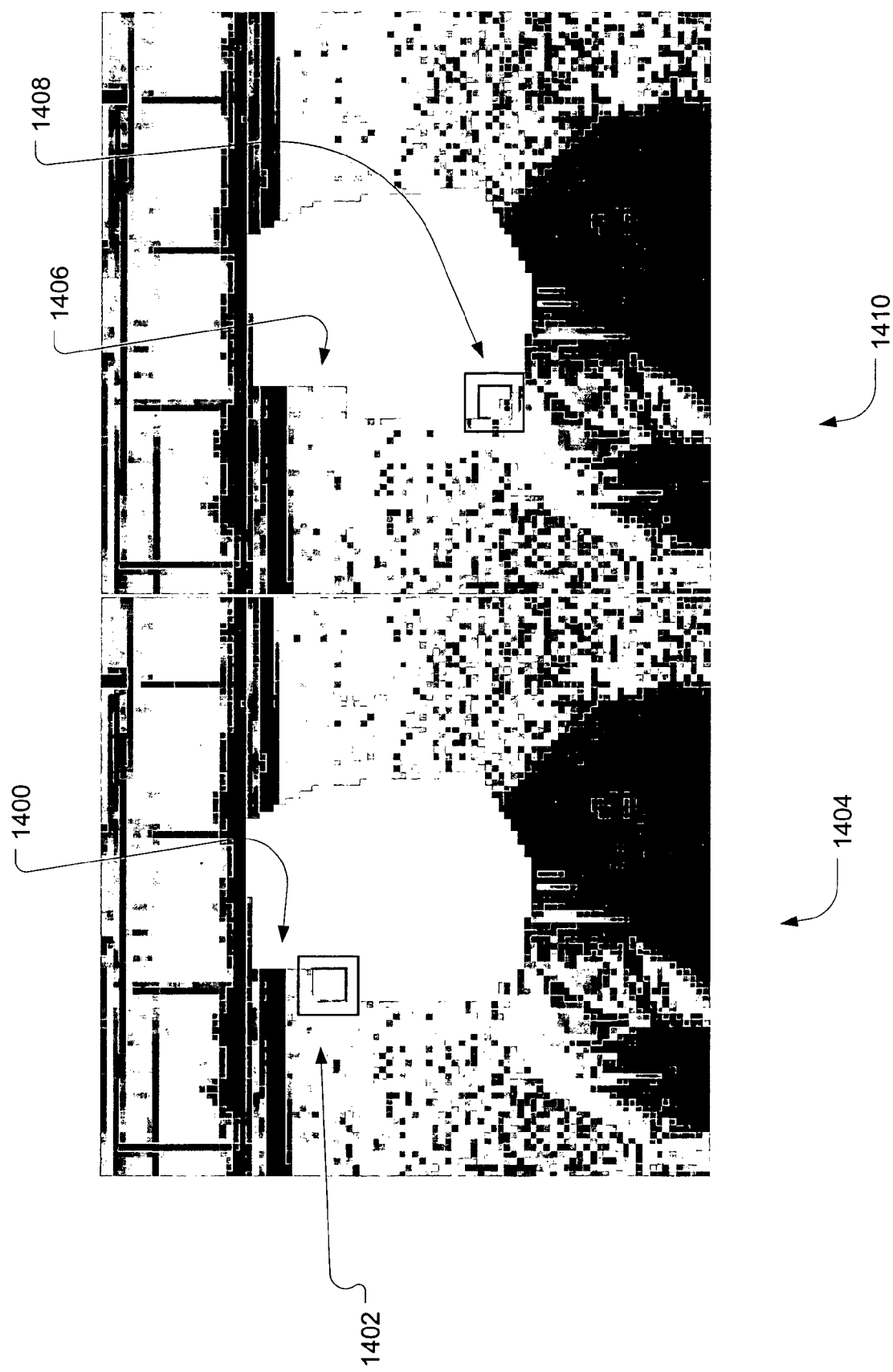
FIG. 14 depicts a sequence of two images having filled-in destination tiles in an implementation of the described system.

FIG. 14 depicts a sequence of two images having filled-in destination tiles in an embodiment of the present invention. In image 1404, a destination tile 1400 has been replaced with image data of a matching example tile. A next destination tile 1402 has been selected for filling. In image 1406, the destination tile 1406 (shown as tile 1402 in image 1404) has been filled, and a next destination tile 1408 has been selected for filling. This filling process proceeds progressively from the boundary of the destination region until the entire destination region has been filled. As the destination tiles are filled in, the destination region gets smaller. Subsequent selections of destination tiles will have neighborhoods that include image data are from the original background or from previously filled-in destination tiles.

Figure 15:
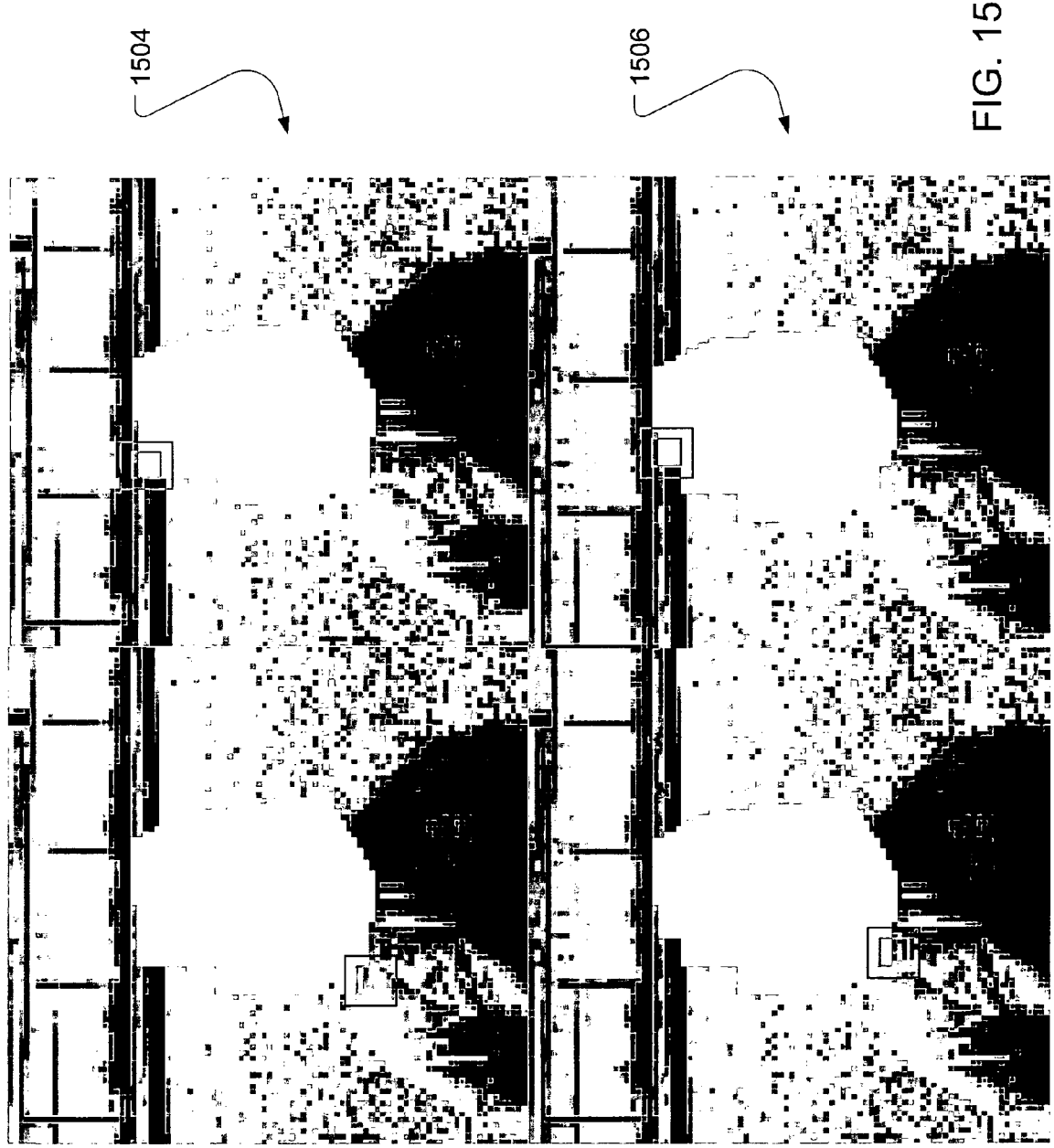
FIG. 15 depicts a sequence of four images having filled-in destination tiles in an implementation of the described system.

FIG. 15 depicts a sequence of four images having filled-in destination tiles in an embodiment the present invention. Images 1500, 1502, 1504, and 1506 show progressive filling of destination tiles based on the process described herein.

Figure 16:
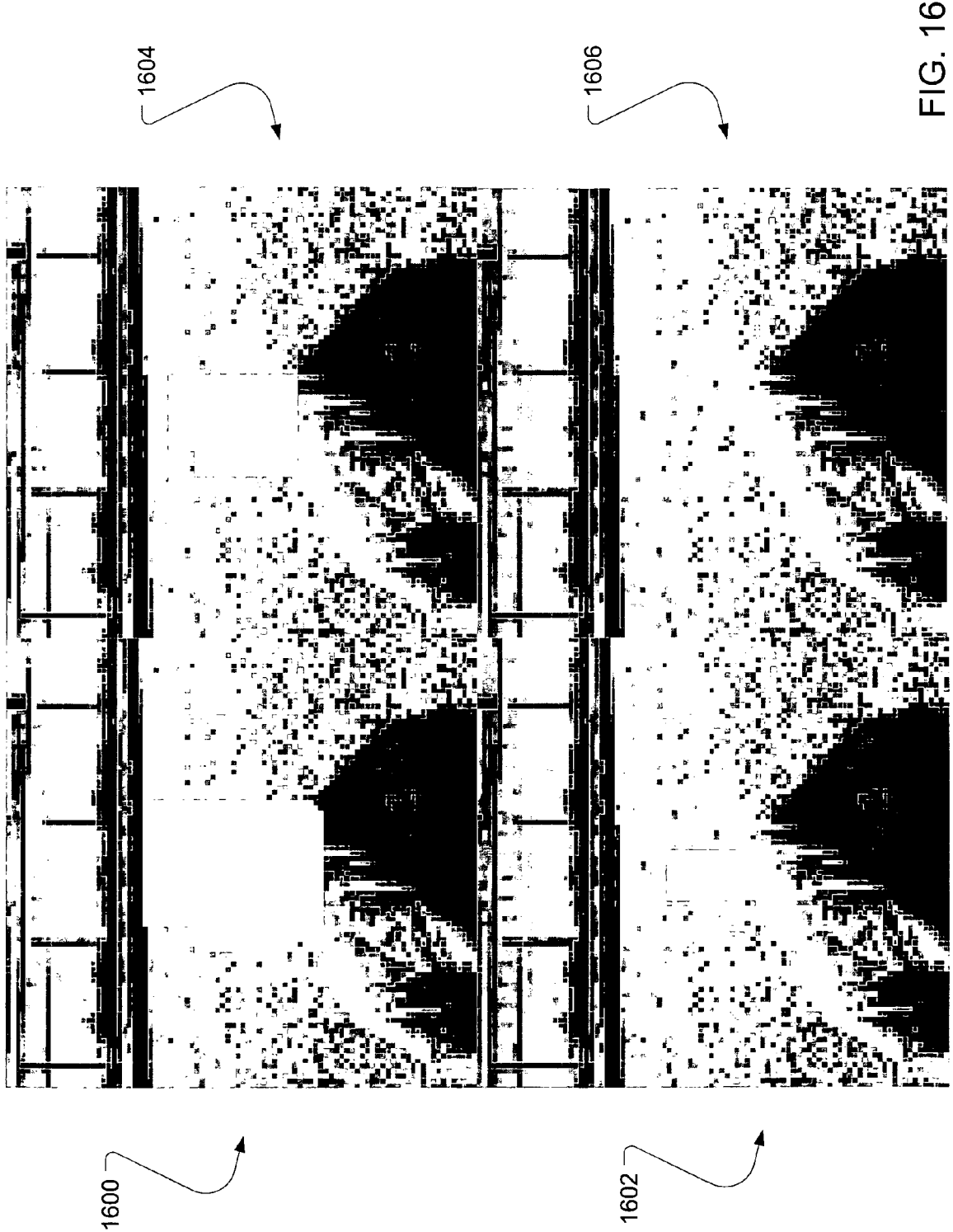
FIG. 16 depicts another sequence of four images having filled-in destination tiles in an implementation of the described system.

FIG. 16 depicts another sequence of four images having filled-in destination tiles in an embodiment the present invention. Images. 1600, 1602, 1604, and 1606 show progressive filling of destination tiles based on the process described herein. In image 1606, the destination region has been completely filled in.

Figure 17:
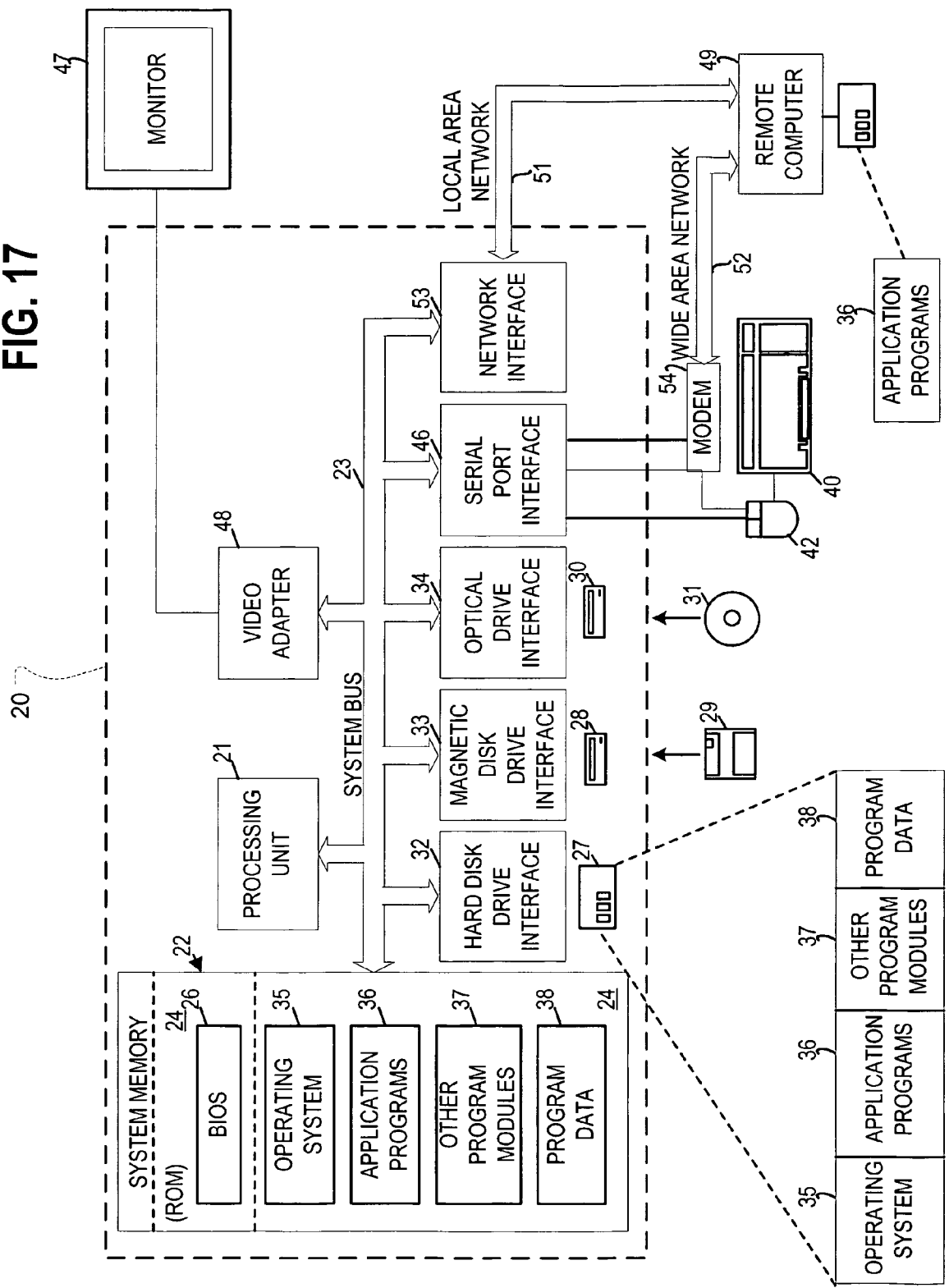
FIG. 17 illustrates an exemplary system useful for implementing an implementation of the described system.

The exemplary hardware and operating environment of FIG. 17 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 17. The logical connections depicted in FIG. 17 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, a dictionary creation module, a destination region processing module, a destination tile processing module, a matching module, and a filling module may be incorporated as part of the operating system 35, application programs 36, or other program modules 37. The dictionary and other image data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The order in which destination tiles are filled may be arbitrary, although an "onion skin" order, in which destination tiles are selected in concentric layers from the outer boundary of the destination region to the center of the destination region, is illustrated in FIGS. 14-16. However, the filling order alternatively may be specified to encourage propagation of linear structures in the destination image. For example, the filling order may be biased toward those destination tiles that are adjacent to isophotes and are surrounded by high-confidence pixels. Generally, the term "isophotes" refers to lines connecting points of equal light intensity. As such, biasing filling order toward destination tiles that are adjacent to isophotes tends to maintain the continuity of linear structures that intersect the boundary of the destination region and extend those structures into the interior of the destination region. Furthermore, in an exemplary embodiment, a predefined tile grid in the destination region may or may not be used. For example, the filling algorithm may dynamically select a sequence of individual points within the destination region or along a fill front and fill destination tiles that are centered on each point. In this manner, destination tiles may overlap each other.

Figure 18:
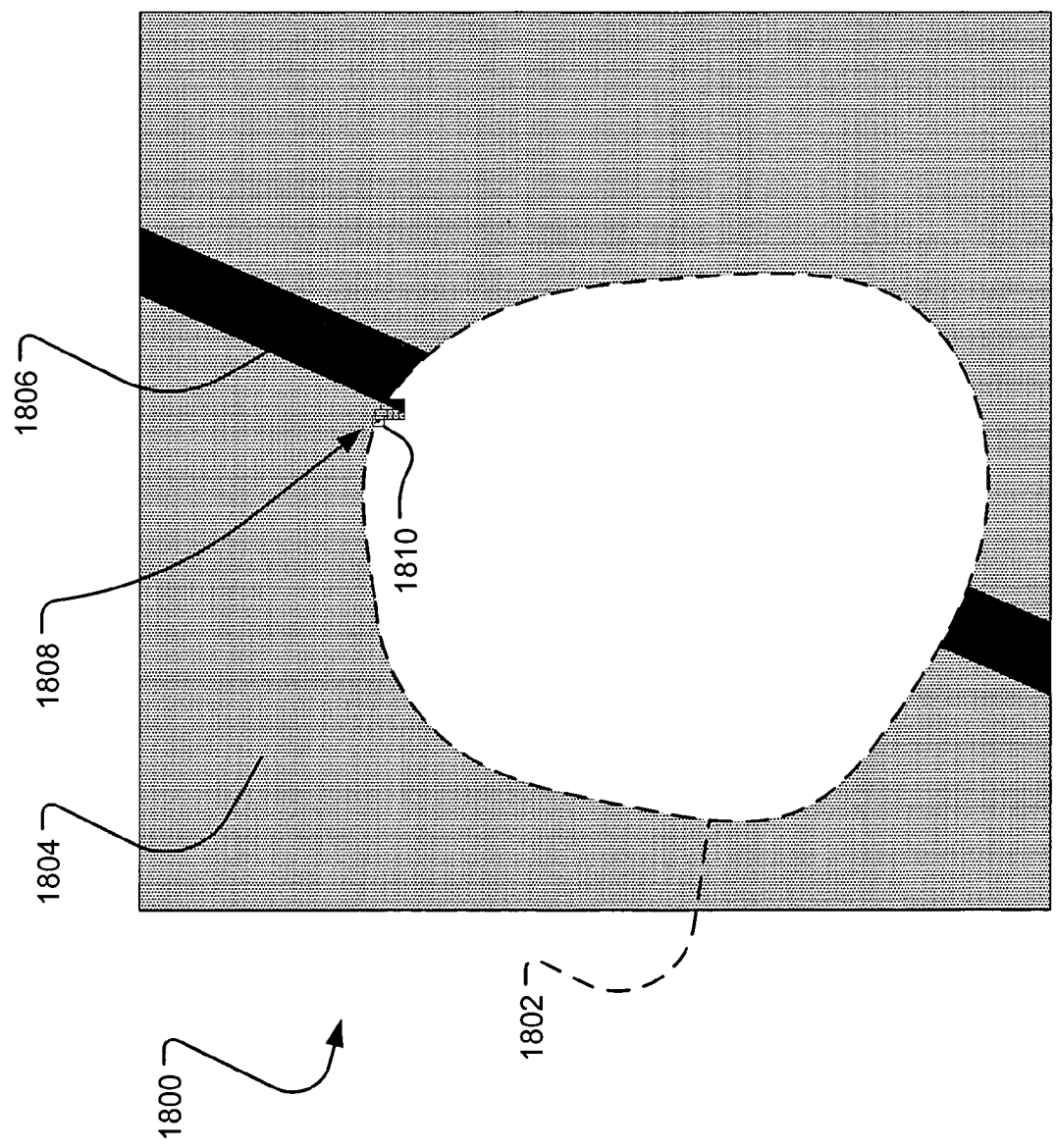
FIG. 18 illustrates an early phase of a specified tiling order in an implementation of an exemplar-based texture synthesis.

FIG. 18 illustrates an early phase of a specified tiling order in an implementation of an exemplar-based inpainting. An image 1800 includes a destination region 1802 on a shaded grey background 1804. A linear structure 1806 extends through the destination region 1802. It is assumed the source region is defined to include all image data from the image 1800 except for that originally within the destination region 1802, although other source region definitions may be used. For example, a source of image data in this implementation, as well as the other implementations discussed herein may be defined as a region in the proximity of the selected destination tile or destination point.

If an arbitrary filling order is used, the linear structure 1806 may or may not be propagated through the destination region 1802, depending largely whether the best match computation captures the edges of the linear structure 1806 when destination tiles along those edges are filled. However, without some control over the filling order, it is likely that at least some portions of the edges of the linear structure 1806 are lost.

Therefore, edges of linear structures that intersect the destination region 1802 may be substantially preserved by giving some level of priority (as reflected by a strength factor) to those destination tiles centered on points that are adjacent to isophotes as well as the determined strength of such isophotes. The result is that the linear structures are substantially propagated into the destination region 1802. Nonetheless, a tradeoff exists between the enhanced propagation of linear structures and an accurate synthesis of destination region textures. Therefore, in one implementation, the priority of a given tile is also influenced by a measure of the reliable information (a confidence factor) surrounding a given pixel p in the destination image.

As shown in FIG. 18, the priority in this early synthesis phase has resulted in the tiles shown generally at 1808 to be filled first, thereby extending the edge of the linear structure 1806 into the destination region. A next destination tile 1810 has been chosen to be filled next.

Figure 19:
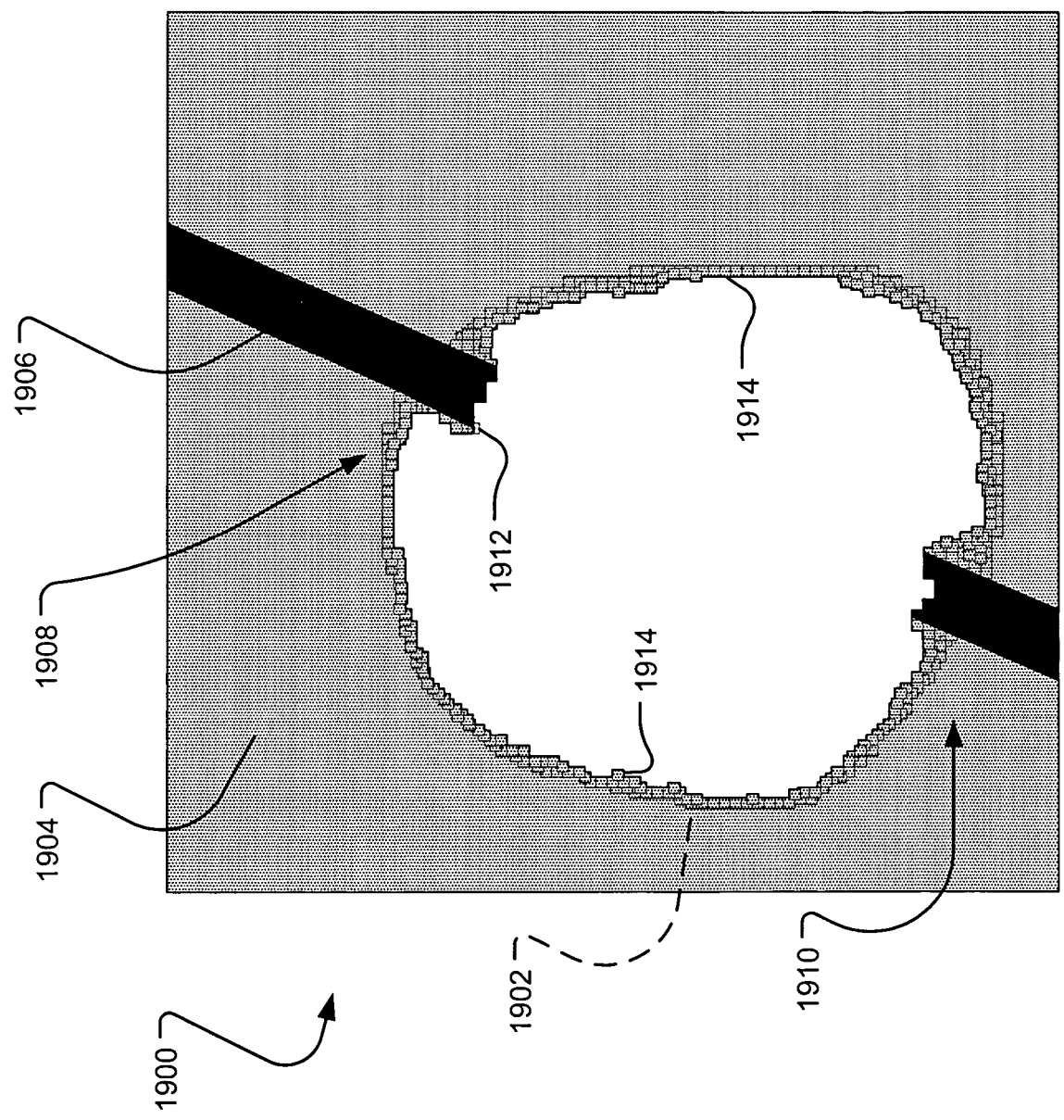
FIG. 19 illustrates a subsequent phase of a specified tiling order in an implementation of an exemplar-based texture synthesis.

In choosing the first destination tile to be filled, the priority of all destination tiles along the "fill front" (i.e., the outermost layer of points in the unfilled destination region, as referenced in FIG. 19 as fill front 1914) are computed, and the destination tile having the greatest priority is filled first. As a result of this filling, the fill front changes to exclude the newly filled tile and to include one or more new, unfilled destination tiles near the newly filled tile. Then, some or all of the priorities of destination tiles in the newly modified fill front are computed. It should be understood that, while all priorities may be recomputed, many will be unchanged. Therefore, in some implementations, only the priorities for newly added tiles and those tiles in the vicinity of the newly filled tile are calculated in the new iteration.

FIG. 19 illustrates a subsequent phase of a specified tiling order in an implementation of an exemplar-based inpainting. An image 1900 includes a destination region 1902 on a shaded grey background 1904. A linear structure 1906 extends through the destination region 1902. The priority in this subsequent synthesis phase has resulted in the tiles shown generally at 1908 and 1910, as well as those around the boundary of the destination region 1902, to be filled first, thereby extending the edge of the linear structure 1906 into the destination region from both sides of the linear structure 1906. With each filled tile, the fill front 1914 changes to reflect the filling, gradually creeping into the destination region as the region fills.

The confidence factor tends to influence the priority such that the linear structure does not propagate without limit through the destination region. Instead, some other tiles having highly reliable information (e.g., those tiles along the concentric layers of the original destination region 1902) have the highest computed priority at given iterations in the filling order and, therefore, are selected for filling ahead of tiles on the edge of the linear structure 1906. This tradeoff balances the filling between tiles on a linear structure and the other tiles within the destination region 1902. A next destination tile 1912 has been chosen to be filled next.

Figure 20:
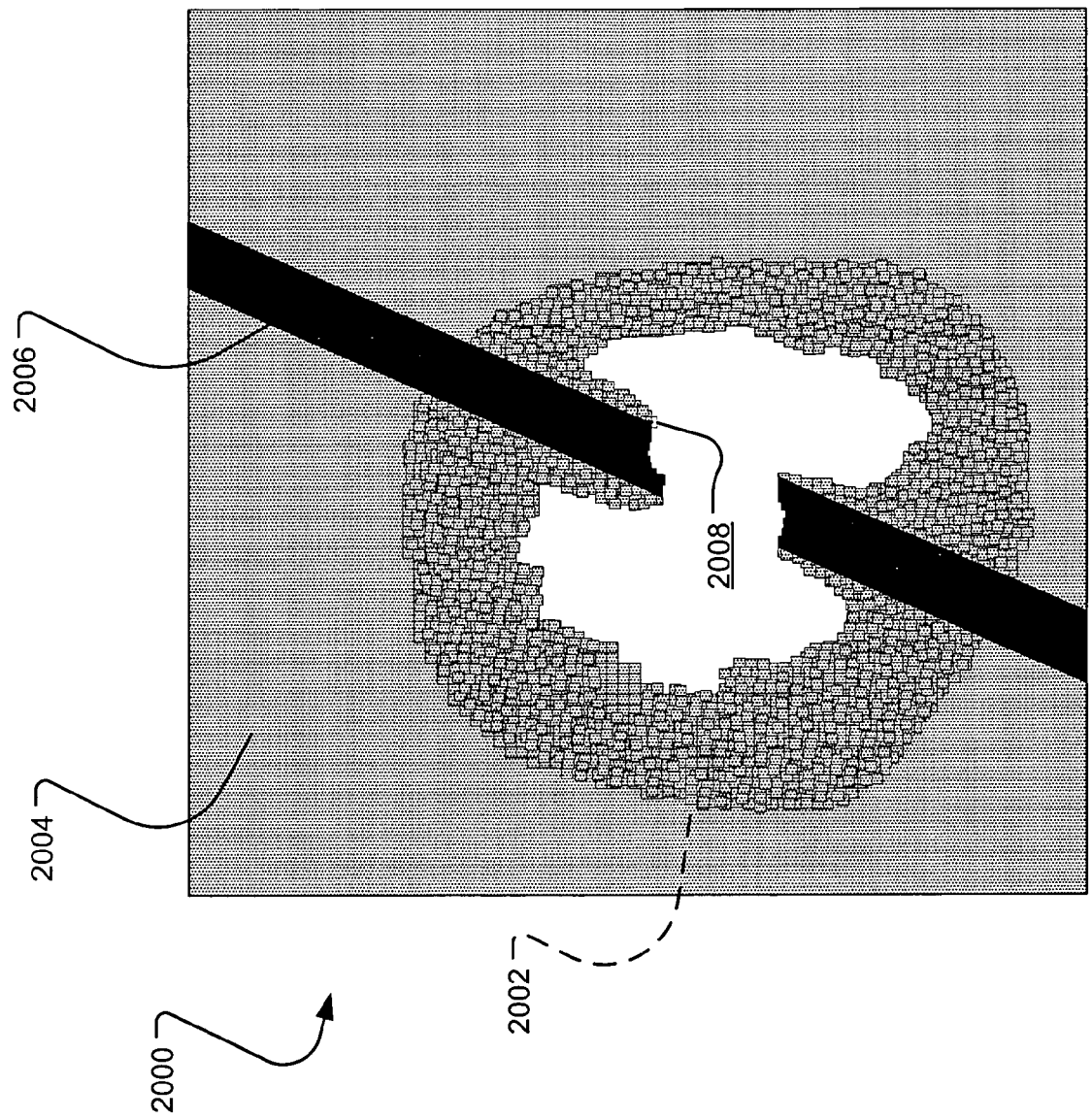
FIG. 20 illustrates a later subsequent phase of a specified tiling order in an implementation of an exemplar-based texture synthesis.

FIG. 20 illustrates a later subsequent phase of a specified tiling order in an implementation of an example-based texture synthesis. An image 2000 includes a destination region 2002 on a shaded grey background 2004. A linear structure 2006 extends through the destination region 2002. The filling order has resulted in the linear structure 2006 being extended through the destination region 2002 from both sides, as well as the filling of much of the interior of the destination region 2002 from the outside boundaries. A next destination tile 2008 has been chosen to be filled next.

Figure 21:
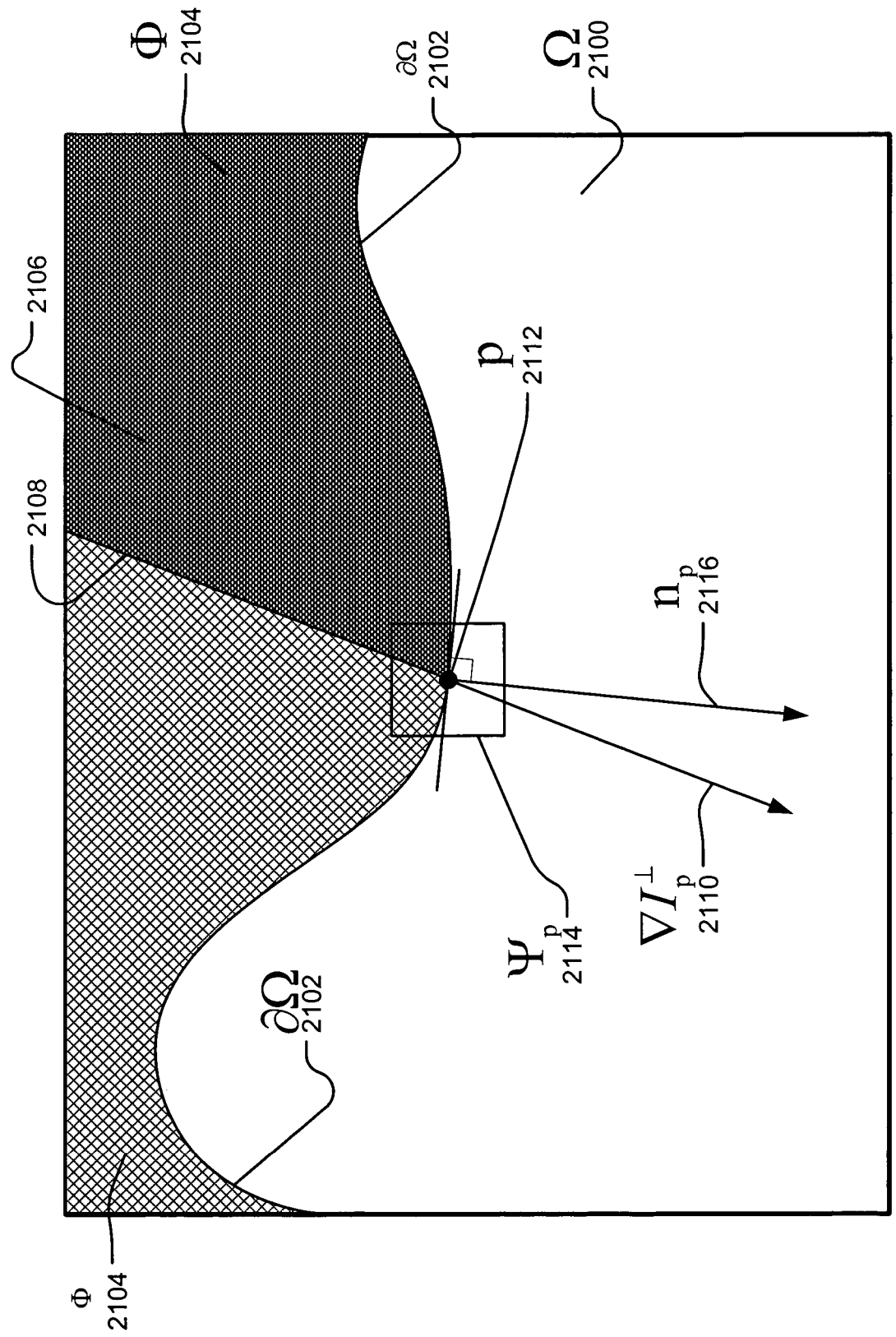
FIG. 21 illustrates notation used in describing an implementation of an exemplar-based texture synthesis.

FIG. 21 illustrates notation used in describing an implementation of an example-based texture exemplar-based inpainting. The algorithm for computing priority is described herein with referenced to such notation. A destination region $\Omega$ (partially shown as region 2100) is selected within an image I. The boundary of the destination region is represented by $\partial\Omega$ (shown as contour 2102). Image data in region $\Phi$ (shown as region 2104) includes image data from the original destination image. The region $\Phi$ includes a dark linear structure 2106, the edge of which is shown as edge 2108. In addition, the arrow 2110 represents an isophotes (direction and intensity), represented by the notation $\nabla I_p^\perp$, at a point p (shown as point 2112) for some $p \in \partial\Omega$. Given a tile $\Psi_p$ (shown as tile 2114) about the point p, $n_p$ represents the normal to the contour 2102 ($\partial\Omega$). A tile may be defined as a fill region of any designated shape that is positioned relative to the point p. In the illustrated embodiment, the tile is square and center at the point p.

A fill priority may be computed in a variety of ways, including without limitation using a confidence factor, a strength factor, or a combination of both, or using other factors. In at least one implementation, an exemplary priority P(p) for the point p is defined as the product of the confidence factor (C(p)) and the strength factor (S(p)), as defined below:

$$P(p) = C(p)S(p) \quad (1)$$

where $$C(p) = \frac{\sum_{q \in \Psi_p \cap \bar{\Omega}} C(q)}{|\Psi_p|}, \quad (2)$$

$$S(p) = \frac{|\nabla I_p^\perp \cdot n_p|}{\alpha}, \quad (3)$$

$|\Psi_p|$ represents the area of $\Psi_p$, $\alpha$ represents a normalization factor (e.g., $\alpha=255$ for a typical gray-level image), and $n_p$ represents a unit vector orthogonal to the boundary $\partial\Omega$ at the point p. The priority is computed for every point in the fill front, with distinct tiles for each pixel on the boundary $\partial\Omega$ of the destination region. It should be understood that other definitions of the confidence factor (C(p)) and the strength factor (S(p)) may also be employed. During initialization, the factor C(p) is set to C(p)=0 $\forall p \in \Omega$ and C(p)=1 $\forall p \in I-\Omega$.

The confidence factor C(p) represents a measure of the amount of reliable information surrounding the point p. Therefore, the confidence factor C(p) encourages early filling of those tiles that have more of their pixels filled, with additional preference given to pixels that were filled early on or that were part of the original destination image outside the destination region (i.e., that were never part of the destination region).

As a coarse level, the confidence factor C(p) tends to enforce a desirable concentric fill order (e.g., an "onion skin" effect). As filling proceeds, pixels in the outer layers of the destination region tend to be characterized by -greater confidence values, and are therefore filled earlier. The influence of the confidence factor C(p) tends to incorporate preference toward certain shapes along the fill front. For example, tiles that include corners of the fill front and thin tendrils of the unfilled destination region tend to be filled first because they include more original or filled pixels. Such tiles provide more reliable information against which the best matching example tile may be found. Conversely, the filling of tiles at the tip of a peninsula of filled pixels jutting into the target region tends to be postponed until more of the surrounding pixels are filled.

The strength factor S(p) is a function of the strength of the isophotes intersecting the fill front at each iteration, thereby amplifying the priority of a tile into which the isophotes "flows". The strength factor S(p) encourages the synthesis of linear structures, as compared to concentric layers. Therefore, linear structures propagate-securely into the destination region.

A balance is maintained between the confidence and strength factors. For example, the strength factor tends to push isophotes rapidly inward, while the confidence factor tends to suppress exactly this sort of incursion into the destination region. Therefore, linear structures are maintained in the destination region while more reliable filling is encouraged from highly reliable information (e.g., already filled or originally filled pixels).

Figure 22:
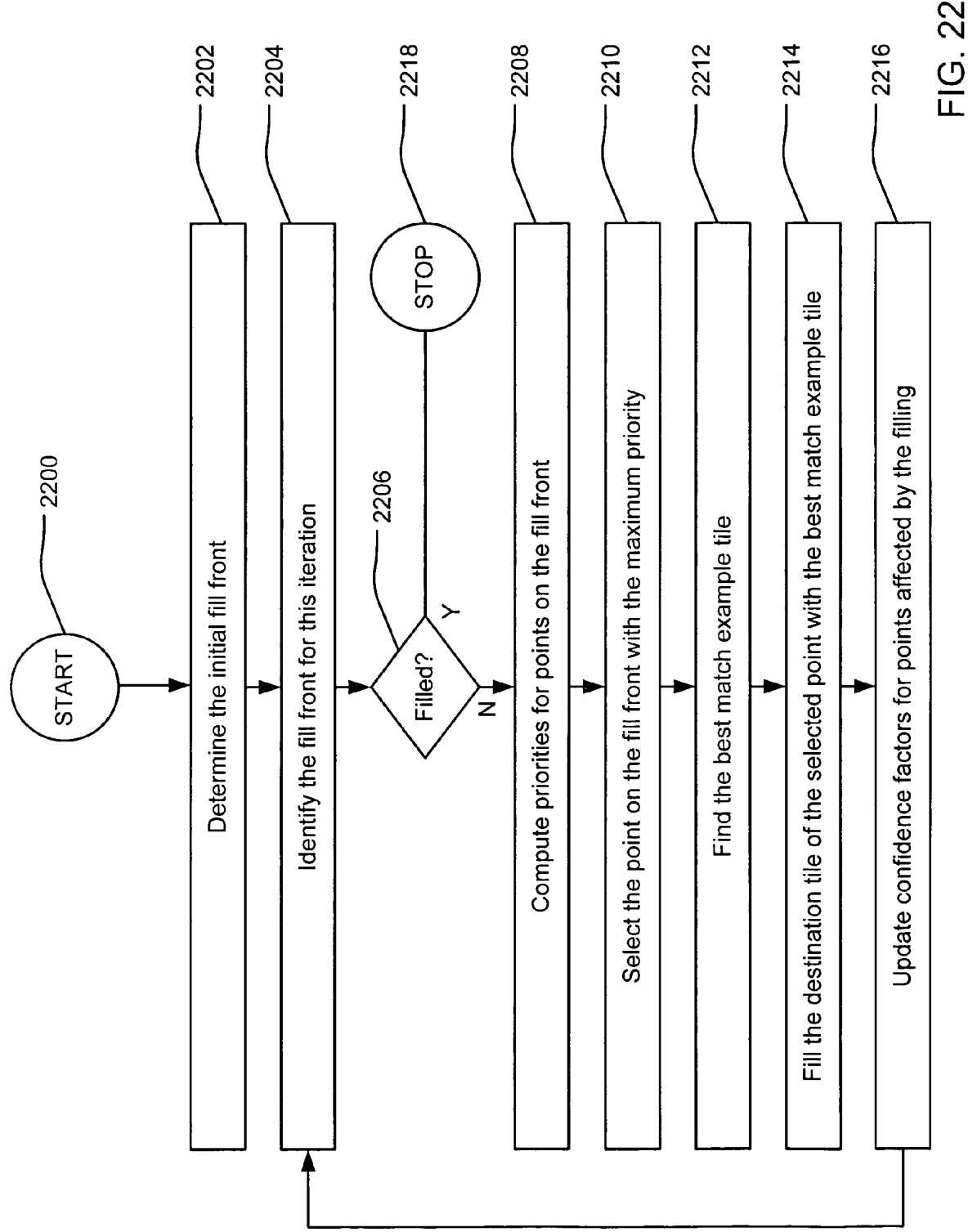
FIG. 22 illustrates exemplary operations for filling a destination region.

In alternative implementations, tile sizes and shapes may differ for different destination regions, for each iteration inside a destination region, or even for different points along the fill front. -For example, larger tiles can be used to capture the statistical properties of a region with lower spatial frequency information. In contrast, smaller tiles would suffice in capturing the essence of regions with high-spatial frequency information (and would be faster too). Tiles sizes may also be adjusted based on CPU load, available memory, isophote strength, etc. In such configurations, a tile size parameter may be adjusted on a regional basis or a point to point basis to implement such different tiles sizes. In other implementations, tile sizes can be varied during a single run of the algorithm or even during a single iteration of the algorithm due to, but not limited to, any of the following: source texture characteristics (e.g., "texel" size); shape and size of the unfilled destination; texture complexity (e.g., homogenous vs. heterogeneous). Likewise, destination region tile shapes may differ to optimize performance or quality of the filling. FIG. 22 illustrates exemplary operations for filling a destination region. A start operation 2200 initiates the process. A determination operation 2202 determines the initial fill front. In one implementation, the initial fill front is defined along the boundary of the destination region and is designated as $\partial\Omega^0$. Such a boundary may be manually or automatically defined.

An identification operation 2204 starts an iteration through each destination tile in the destination region by identifying the fill front $\partial\Omega^t$ for a current iteration t. It should be understood that, for each iteration, the fill front changes by the filling of one of the destination tiles on the previous fill front. Therefore, the current fill front is re-identified for each iteration.

A decision block 2206 determined whether the destination region is completely filled (e.g., whether $\Omega^t=0$). If so, the process terminates at stop operation 2218. Otherwise, the process proceeds to a computing operation 2208, which computes the priorities for points on the fill front. A selection operation 2210 selects the point on the fill front that has the highest priority as the point for which the next destination tile will be filled. In at least one implementation, the selection may be represented by $\Psi_p=\arg\max_{p\in\partial\Psi^t}P(p)$, where $\Psi_p$ represents the selected destination tile in the fill front to be filled next.

A match operation 2212 finds the example tile from the source that provides the best match with the selected destination tile in the fill front. At least one implementation of a match operation has been described previously herein. A fill operation 2214 fills the selected destination tile with the image data from the best match source tile, as described previously herein. A confidence factor updating operation 2216 updates the confidence factors for points affected by the filling operation 2214. For example, the filling operation 2214 adds new reliable information into the fill front, thereby changing the confidence factors for one or more nearby pixels (e.g., the pixels in the area delimited by the filled destination tile. In at least one implementation, the updating may be represented by $C(q)=C(\hat{p})\forall q\in\Psi_p\cap\Omega$. Processing then loops back to the identification operation 2204.

In one implementation, the operations 2204, 2208, and 2210 may be performed by a priority module in the destination tile processing module 811 of FIG. 8. However, in alternative implementations, such operations may be performed by other modules in the system. In addition, in one implementation, the determination operation 2202 is augmented to compute the priorities and confidences of all points in the destination region. In this implementation, the priorities are fixed after determination operation 2202 is completed. Therefore, it is unnecessary to re-compute priorities for each point on the fill front with each iteration and computing operation 2208 is unnecessary. Priorities and confidences for points within the destination region that are not on the original fill front may be computed or estimated using various techniques, such as (1) straight-line extensions of the isophote-based algorithm described herein; (2) subjective contours; or (3) other means.

Figure 23:
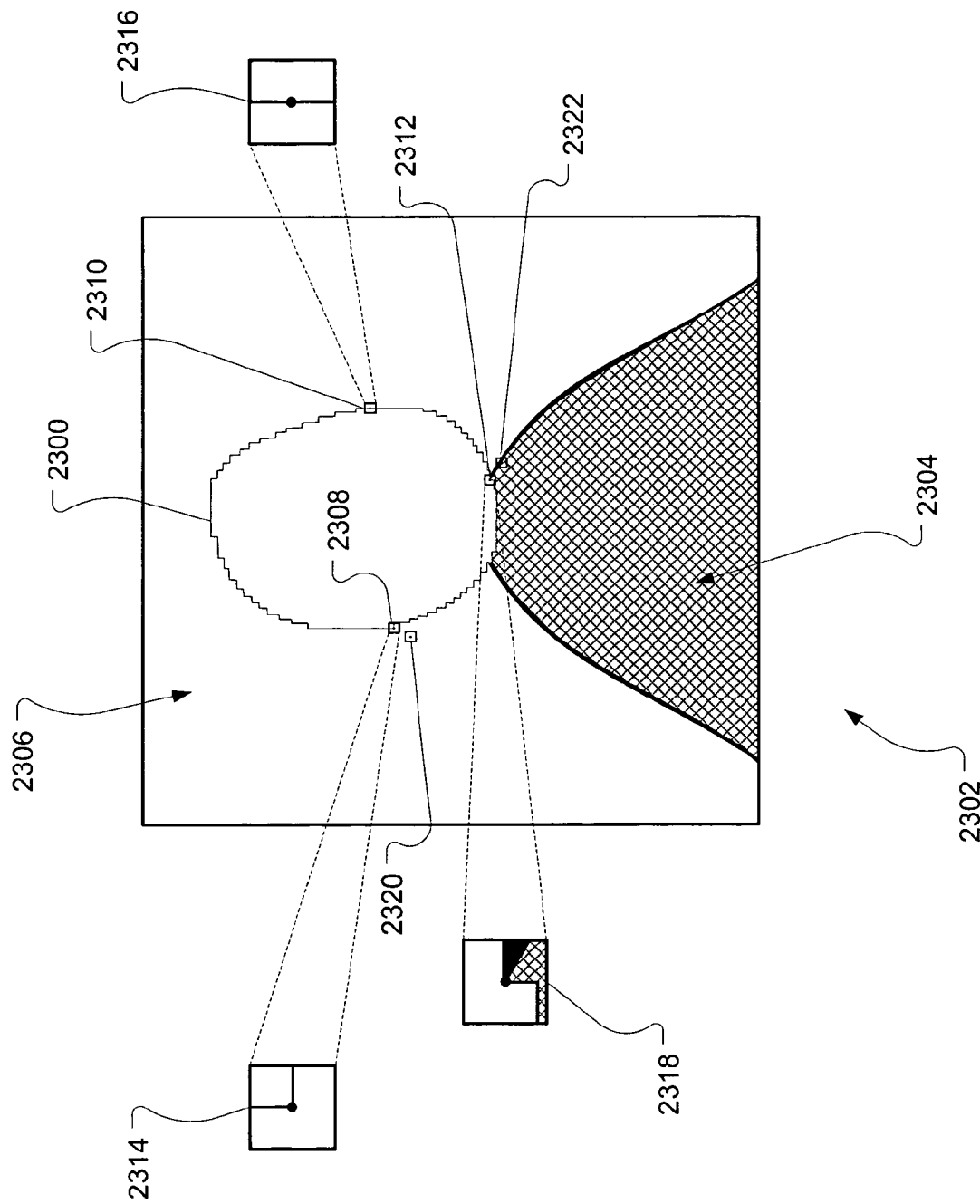
FIG. 23 illustrates point-centered destination tiles along a fill front and some example tiles in an implementation of the described system.

FIG. 23 illustrates point-centered destination tiles along a fill front and some example tiles in an implementation of the described system. A destination region 2300 is selected in a destination image 2302 of the happy bald man from FIG. 4. The image 2302 includes the texture 2304 of the man's smock and a background texture 2306. In the illustrated implementation, the fill front of the destination region 2300 includes three exemplary tiles 2308, 2310, and 2312, with magnified versions of these tiles shown as 2314, 2316, and 2318, respectively. Each magnified version of the tiles shows a centered point surrounded by image data within the boundary of the tile. In one implementation, the fill priority values for all tiles on the fill front will be computed to determine the next field tile, although in alternative implementations, fill priorities values for fewer than all tiles on the fill front may be computed or more than just the tiles along the fill front may be computed at any given iteration.

As shown in magnified tile 2314, a majority of the area in the tile 2314 includes filled image data, thus strongly contributing to the confidence factor of the tile 2314. In contrast, the magnified tile 2318 shows that a minority of the area of the tile 2318 includes filled image data. However, the magnified tile 2318 also shows a linear structure in representing the border between the background 2306 and the smock texture 2304, thereby contributing to the strength factor of the tile 2318. It is unclear from the illustration which of the three exemplary tiles (or other tiles) will yield the highest priority value.

For each tile 2308, 2310, and 2312 in the destination region fill front, example tiles are evaluated to find replacement image data that will be used to fill the unfilled portion of the fill front tile. In one implementation, the examples tiles are taken from a "ribbon" surrounding the destination region 2300. Alternatively, example tiles may be taken from a region in the proximity of the selected fill front tile, from anywhere in the image, from other images, from derivations of any of these example tiles (e.g., rotations or reflections of such tiles), etc. Examples tiles taken from the destination image 2303 are shown as tiles 2318 and 2320.

Figure 24:
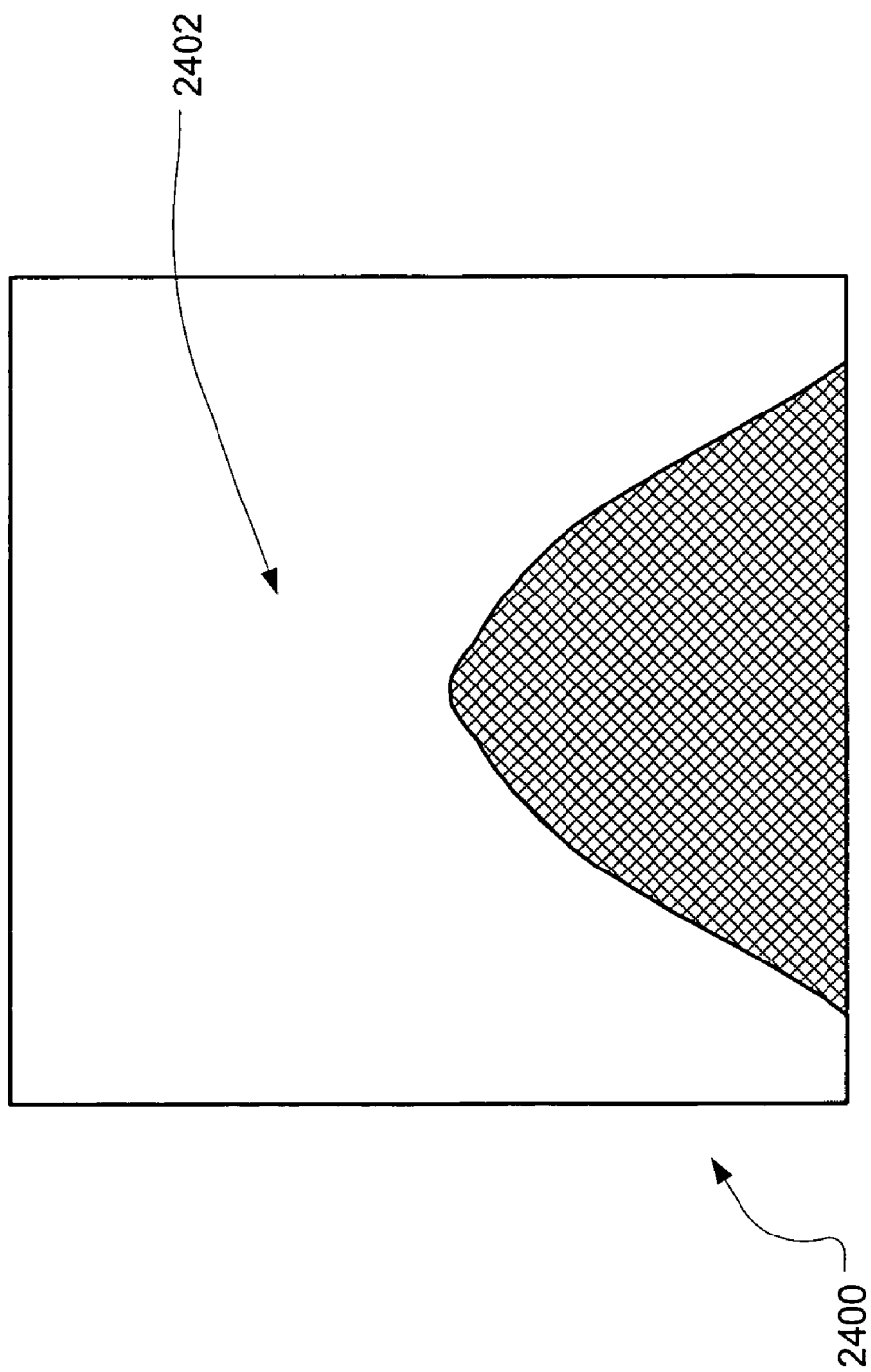
FIG. 24 illustrates an image having a filled destination region in an implementation of the described system.

FIG. 24 illustrates an image 2400 having a filled destination region 2402 in an implementation of the described system. The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A computer-readable medium storing a computer program which when executed on a computer system operates a computer process, the computer process comprising:
   computing a fill priority for each point on a fill front of a destination region in an image;
   filling a destination tile associated with a point on the fill front having the highest fill priority associated with the fill front;
   defining a new fill front of the destination region, excluding the filled destination tile;
   computing a fill priority for each point on the new fill front; and
   filling a destination tile associated with a point on the new fill front having the highest fill priority associated with the new fill front.

2. The computer-readable medium of claim 1 wherein the operation of computing a fill priority for each point on a fill front comprises:
   computing a confidence factor for a point on the fill front; and
   computing the fill priority for the point on the fill front based on the confidence factor.

3. The computer-readable medium of claim 1 wherein the operation of computing a fill priority for each point on a fill front comprises:
   computing a confidence factor for a point on the fill front, wherein the confidence factor represents a measure of filled image data surrounding the point; and
   computing the fill priority for the point on the fill front based on the confidence factor as a component.

4. The computer-readable medium of claim 1 wherein the operation of computing a fill priority for each point on a fill front comprises:
   computing a strength factor for a point on the fill front; and
   computing the fill priority for the point on the fill front based on the strength factor.

5. The computer-readable medium of claim 4 wherein the strength factor represents the strength of an isophote intersecting the fill front.

6. The computer-readable medium of claim 1 wherein the destination tile associated with the point on the fill front has a different size than the destination tile associated with the point on the new fill front.

7. The computer-readable medium of claim 1 wherein the destination tile associated with the point on the fill front has a different shape than the destination tile associated with the point on the new fill front.

8. The computer-readable medium of claim 1 wherein the operation of computing a fill priority for each point on a fill front comprises:
   computing a strength factor for a point on the fill front;
   computing a confidence factor for the point on the fill front; and
   computing the fill priority for the point on the fill front based on the strength factor and the confidence factor.

9. The computer-readable medium of claim 8 wherein the strength factor represents the strength of an isophote intersecting the fill front.

10. The computer-readable medium of claim 1 the computer process further comprising: comparing the fill priorities of the points on the fill front to select a point on the fill front having the highest fill priority.

11. A computer-readable medium storing a computer program which when executed on a computer system operates a computer process, the computer process comprising:
    computing a fill priority for each point on a fill front of a destination region in an image, the fill priority being dependent upon a confidence factor and a strength factor; and
    filling a destination tile associated with a point on the fill front having the highest fill priority associated with the fill front, before filling any other point on the fill front.

12. The computer-readable medium of claim 11 wherein the operation of computing a fill priority for each point on a fill front comprises:
    computing the confidence factor for a point on the fill front, the confidence Y-C(q) factor being defined as $$C(p) = \frac{\sum_{q \in \Psi_p \cap \bar{\Omega}} C(q)}{|\Psi_p|}$$

and computing the fill priority for the point on the fill front based on the confidence factor.

13. The computer-readable medium of claim 11 wherein the operation of computing a fill priority for each point on a fill front comprises:
    computing the confidence factor for a point on the fill front, wherein the confidence factor represents a measure of filled image data surrounding the point; and
    computing the fill priority for the point on the fill front based on the confidence factor as a component.

14. The computer-readable medium of claim 11 wherein the operation of computing a fill priority for each point on a fill front comprises:
    computing the strength factor for a point on the fill front, the strength factor as $$S(p) = \frac{|\nabla I_p^\perp \cdot n_p|}{\alpha}$$

a computing the fill priority for the point on the fill front based on the strength factor.

15. The computer-readable medium of claim 11 the computer process further comprising: comparing the fill priorities of the points on the fill front to select a point on the fill front having the highest fill priority.

16. The computer-readable medium of claim 11 wherein the strength factor represents the strength of an isophote intersecting the fill front.

17. A system comprising:
    a priority module computing a fill priority for each point on a fill front of a destination region in an image, the fill priority being dependent upon a confidence factor and a strength factor; and
    a filling module filling a destination tile associated with a point on the fill front having the highest fill priority associated with the fill front, before filling any other point on the fill front.

18. The system of claim 17 wherein the strength factor represents the strength of an isophote intersecting the fill front.

19. The system of claim 17 wherein the priority module further compares the fill priorities of the points on the fill front to select a point on the fill front having the highest fill priority.

* * * * *